(12) United States Patent
Williams

(10) Patent No.: US 6,407,361 B1
(45) Date of Patent: *Jun. 18, 2002

(54) METHOD OF THREE DIMENSIONAL LASER ENGRAVING

(75) Inventor: Mark S. C. Williams, Lee's Summit, MO (US)

(73) Assignee: High Tech Polishing, Inc., Lee's Summit, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/325,065

(22) Filed: Jun. 3, 1999

(51) Int. Cl.[7] ............................................. B23K 26/38
(52) U.S. Cl. ............................. 219/121.69; 219/121.83
(58) Field of Search ..................... 219/121.68, 121.69, 219/69.17, 121.83

(56) References Cited

U.S. PATENT DOCUMENTS

| | | | |
|---|---|---|---|
| 3,591,761 A | * 7/1968 | Bederman | 219/69.16 |
| 4,469,930 A | * 9/1984 | Takahashi | 219/121.72 |
| 4,918,611 A | * 4/1990 | Shyu et al. | 219/121.67 |
| 4,968,064 A | 11/1990 | Mancuso | |
| 4,970,600 A | * 11/1990 | Garnier et al. | 219/121.68 |
| 5,336,458 A | 8/1994 | Hutchison et al. | |
| 5,364,494 A | 11/1994 | Hutchison et al. | |
| 5,660,668 A | * 8/1997 | Matheson et al. | 219/121.68 |
| 5,880,430 A | 3/1999 | Wein | |

OTHER PUBLICATIONS

"Prismatic Imaging" brochure, R.J.M. Graphics, Inc., Middleboro, MA, no publication date.
"FOBA–LAS" brochure, FOBA North American Laser System, Lee's Summit, MO, no publication date.
"He had the idea . . . " brochure, FOBA Elektronik +Lasersystems, Ludenscheid, German, no publication date.
Precise Laser Engraving . . . : brochure, High Tech Laser, division of High Tech Polishing Inc., Lee's Summit, MO, no publication date.

* cited by examiner

*Primary Examiner*—Geoffrey S. Evans
(74) *Attorney, Agent, or Firm*—Chase Law Firm, L.C.

(57) ABSTRACT

A method for laser engraving a three-dimensional image into a workpiece includes providing a plurality of pieces of artwork which form a composite three-dimensional image. Each piece of artwork corresponds to a particular layer of material to be removed from the workpiece. The pieces of artwork are sequentially read by laser system program software which translates the lines on each piece of artwork into signals corresponding to laser paths. The signals are received by the laser system control assembly for directing the laser beam along the workpiece in a layer-by-layer relationship corresponding to the sequentially read pieces of artwork. The use of the plurality of pieces of artwork allows for a layer-by-layer removal of material in the workpiece such that the power of the laser need not be continuously adjusted according to the depth of penetration into the workpiece. The method allows for various engraved images to be presented having various sloped surfaces therein.

17 Claims, 34 Drawing Sheets

METHOD OF THREE DIMENSIONAL LASER ENGRAVING

BACKGROUND OF THE INVENTION

This invention relates to a process for engraving an image into a workpiece and, more particularly, to a method for engraving of an image into a die plate by utilizing a layer-by-layer removal of material from the workpiece between the surface of the workpiece and the deepest point of the engraving into the workpiece.

Today's laser system technology utilizes a program software which translates artwork of a desired image into control signals. The signals are directed to a control assembly which focuses a laser beam onto a separate workpiece according to lines of the artwork. The engraving is carried out by thermal interaction between the laser beam and the workpiece. The finished workpiece may be a mold for embossed items.

Heretofore, if the depth of the engraved image in the workpiece was not constant, the variations in the depths of the image were addressed by increasing the power (watts) of the laser. This increase of power increases the depth of laser penetration into the workpiece and thus the depth of material removed. The need to vary the power leads to inefficient laser use as continuous power adjustments need be made during the laser engraving process.

I have invented a method, which more efficiently addresses the penetration of the laser into the workpiece according to various layers of penetration without the need to continuously adjust the laser power.

My method utilizes available computer and laser system technology, e.g., the FOBA-LAS F94 and F114 laser engraving system distributed by FOBA North America Laser Systems of Lee's Summit, Mo., or similar galvo beam drive Nd:yag lasers. Such a system includes computer program technology, which converts lines on provided artwork to control signals. The control assembly, responsive to such signals, guides the laser beam along the separate workpiece in correspondence to lines on the provided artwork. My method presents to a galvo driven Nd:yag laser system a composite piece of artwork comprising a plurality of pieces of artwork which form the overall image desired for engraving into the workpiece. Each piece of artwork has lines appearing thereon which the laser system software converts into laser paths of material removal. Each piece of artwork corresponds to a layer of material in the workpiece between the surface of the workpiece and the deepest point thereof. The laser system program software reads these pieces of artwork in a sequential manner starting with the top layer of the workpiece and descending therefrom. Upon completion a three-dimensional image will be engraved into the workpiece. The use of the plurality of artwork pieces corresponding to material layers provides for a layer by layer removal of material from the workpiece which precludes the need to adjust laser power.

This above method is particularly used for engraving a three-dimensional image into a die plate/mold used for forming items having embossed images thereon.

It is accordingly a general object of this invention to provide a method of engraving a three-dimensional image having variously exposed sloped surfaces into a workpiece, e.g., a mold/die plate utilizing available laser system technology.

Another object of this invention is to provide a method, as aforesaid, which engraves an image into a workpiece utilizing a layer by layer removal of material from the workpiece.

A further object of this invention is to provide a method, as aforesaid, which precludes the need to continuously adjust the laser beam power during engraving of the workpiece.

Another object of this invention is to provide a method, as aforesaid, which utilizes a plurality of pieces of artwork comprising the desired image at selected dimensions to be engraved into the workpiece with each piece of artwork corresponding to a layer of material to be removed from the workpiece.

Still another object of this image is to provide a method, as aforesaid, which can be performed utilizing available computer technology for providing the artwork pieces.

A further object of this invention is to provide a method, as aforesaid, which increases the efficiency of use of a laser engraving system.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Turning more particularly to the drawings, FIGS. 1–34 illustrate my method which will enable one skilled in the art to practice the same. Although my method can be manually implemented, it is preferably implemented by utilizing available computer software, e.g., AutoCad, CorelDraw or any compatible software which may be integrated into the utilized laser system.

My method is to be used in connection with a laser engraving system which includes program software capable of transforming artwork into control signals for delivery to a laser control assembly. One laser engraving system utilized is the FOBA-LAS F94 or F114 laser engraving system designed for mold surface engraving. Either system is available from FOBA® North America Laser Systems in Lee's Summit, Mo. The FOBA® system includes Fobagraf software capable of reading the design artwork which is to be engraved into the mold surface. The design artwork is entered into the system in a file format. The laser software recognizes lines on the artwork as laser paths. In turn, the software generates control signals for delivery to the laser control assembly. The control assembly directs the laser along the workpiece in correspondence to these lines. My invention is directed to the creation of composite artwork which directs the laser at a constant power along the workpiece in a layered manner to arrive at the desired engraving.

Heretofore, the depth of the laser beam penetration into the mold/workpiece was varied by adjustment of the laser power (watts). The greater the power the greater the depth of laser beam penetration into the workpiece. The need to continuously adjust the laser power was not conducive to efficient laser engraving of a three-dimensional engraving into the workpiece.

In my method a plurality of pieces of artwork forming the overall image is created for sequential presentation to the laser program software. Each layer of artwork corresponds to a layer of material in the workpiece. Each layer of artwork has lines thereon which represent the laser path for the corresponding material layer. The laser program software converts the lines on each artwork piece to signals which control laser movement. The material in the workpiece is removed from the workpiece for that particular layer according to the lines appearing on the particular piece of artwork.

The artwork can be created utilizing available CAD or vector format software. The plurality of pieces of artwork, when combined together, present the desired engraved image.

Figure 1:
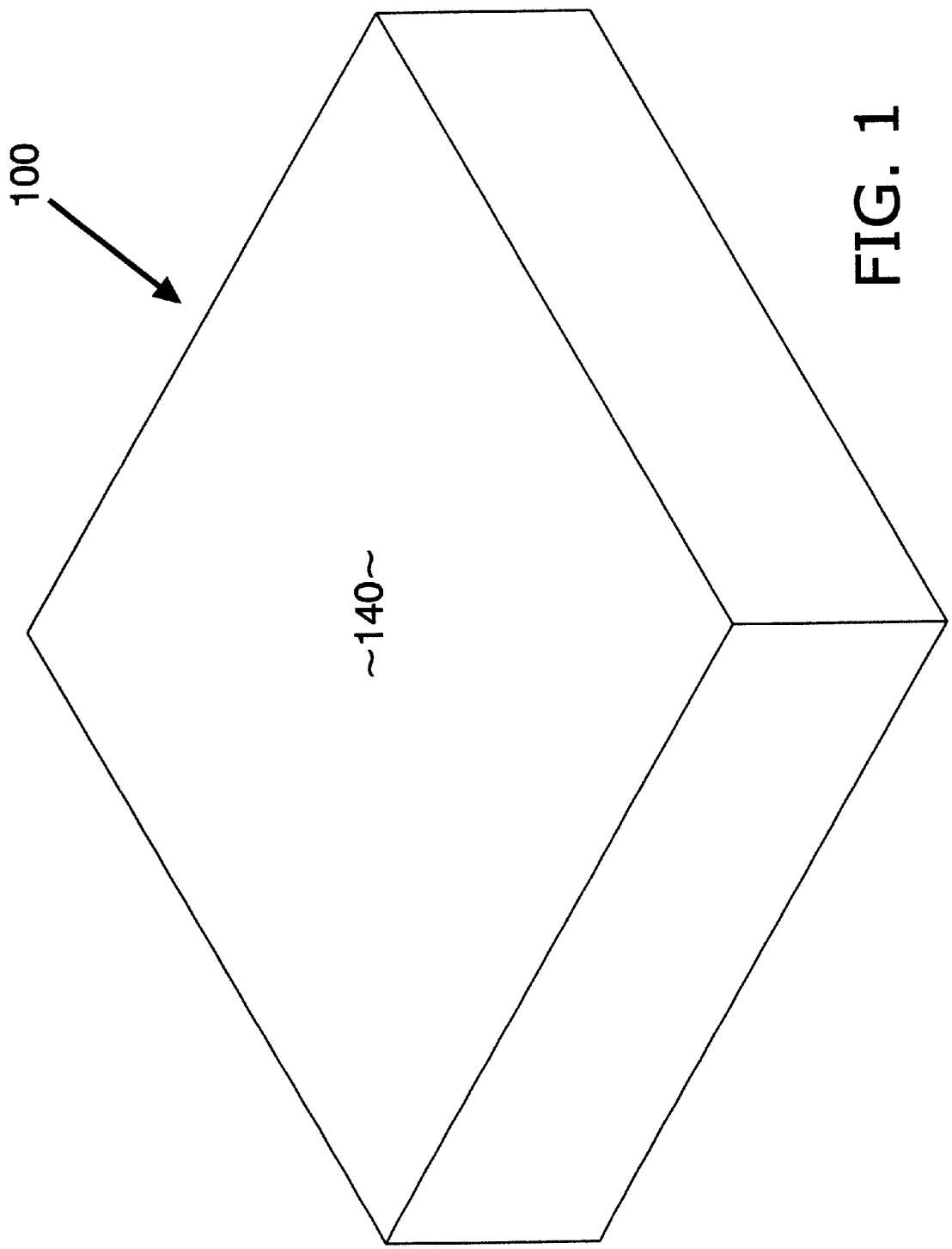
FIG. 1 is a view showing a workpiece for subsequent laser engraving.
Figure 2:
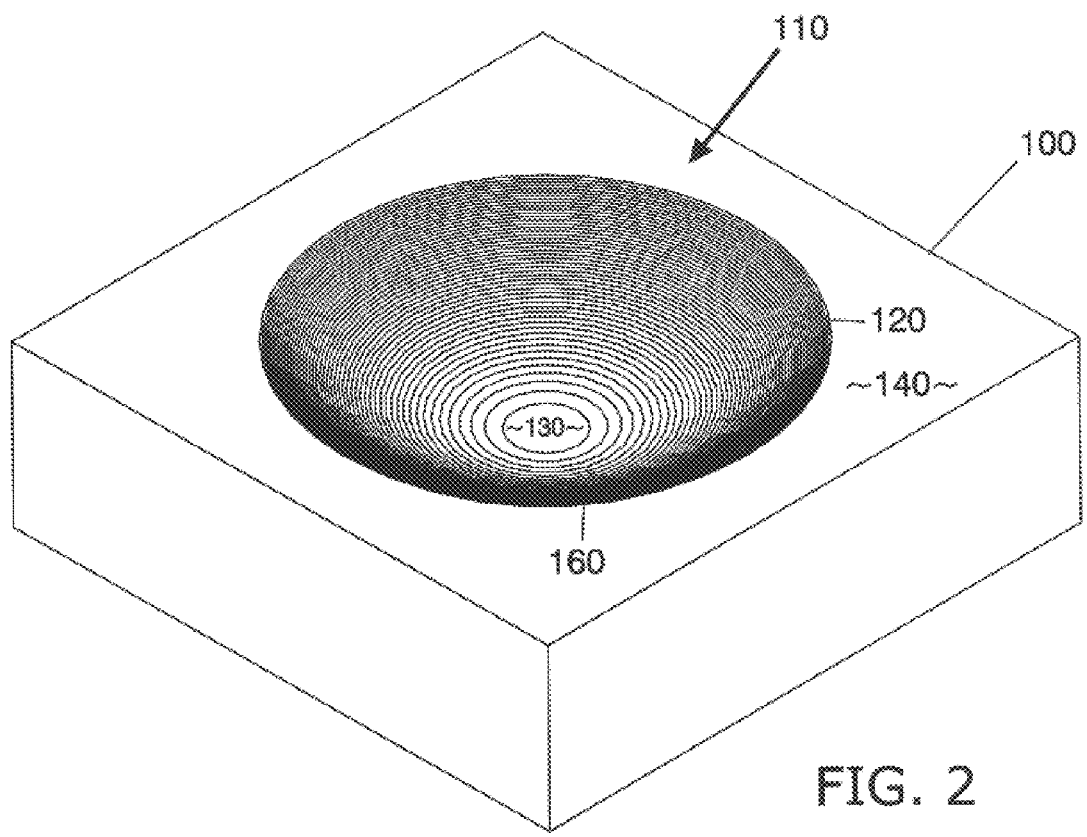
FIG. 2 shows the completed engraving of a dome/hemisphere into the FIG. 1 workpiece utilizing my method.

For ease of illustration and not limitation, I have chosen to depict my method for engraving into a die block/workpiece 100 (FIG. 1). It is understood that the engraved images will vary in complexity according to the desired three-dimensional image. The purpose of my disclosure is to enable one to understand my method as to such basic designs. This disclosure will enable more complex designs to be engraved. The engraving is to be a hemisphere/dome 110 (FIG. 2). As shown in FIG. 2, the depth of the dome increases between the greatest circle 120 which forms the dome perimeter 120 on the block surface 140 to the deepest point 130 in the block 100 which contains the dome apex 130. Heretofore, to engrave such an image into the block 100 the laser power would be increased as it progressed between the surface 140 and the apex 180 as the amount of block material which needed to be removed increased.

In my method the laser power need not be increased as the block material is removed in layers of constant thickness between the dome circumference 120 on the block surface 140 and vertex 130 as guided by the corresponding pieces of the composite artwork.

Figure 3:
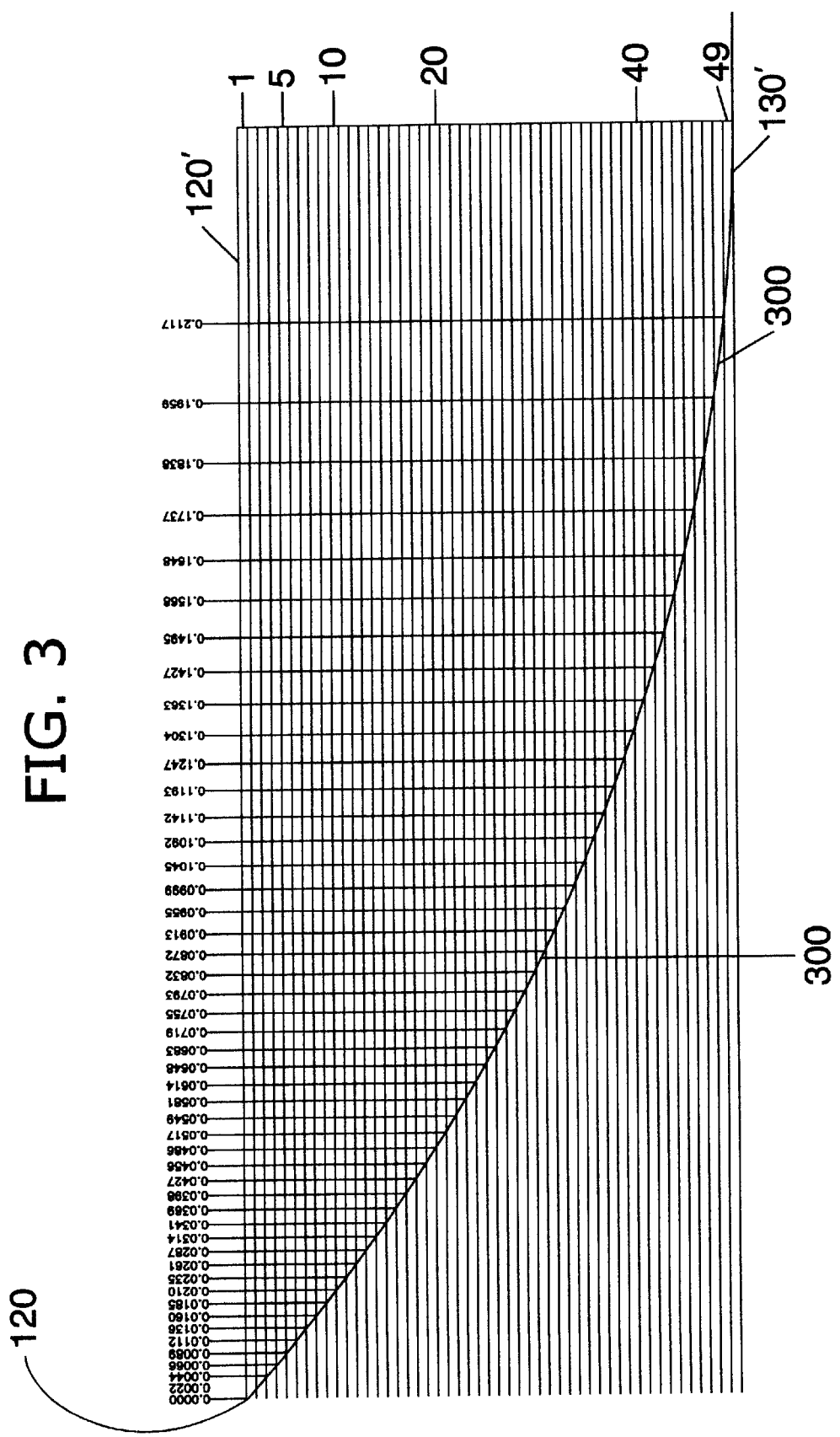
FIG. 3 illustrates an X-Z grid and slope line thereon utilized in the method for engraving the FIG. 2 dome into the workpiece.

To implement this method, an X-Z grid is constructed which presents a series of equidistant, parallel, horizontal lines in the vertical Z direction (FIG. 3). The parallel lines define therebetween a horizontal layer of the workpiece. As the distance between parallel lines is equal, the thickness of each layer of material is constant.

In FIG. 3 the top surface of the workpiece is represented by the top parallel line 120'. The lowest parallel line 130' contains the deepest point 130 or vertex of the dome to be engraved into the workpiece 100. The X distance between the point 120 and 130 is the preselected X distance between a point on the circle 120 and a vertical normal line passing through its apex 130. This distance corresponds to the radius of circle 120. A slope line 300 is then drawn between these two points 120, 130 on the grid. The curvature of this line 300 corresponds to the inside slope/curvature of the dome.

The intersection of the slope line 300 with each parallel line between the top 120' and bottom 130' lines defines a point on the slope line 300. Once so defined a vertical line is drawn to each point on the slope line 300. Each vertical line is normal to the parallel line at the intersection of the slope line 300. Thus a plurality of parallel vertical lines result. Each pair of horizontal, parallel lines defines a layer of material in block 100. The X distances between each parallel vertical line and the point 120 are then determined. Each X distance indicates the X distance of the point on slope line 300 from the circle 120. This X distance is the starting point of the laser, as offset from the perimeter circle 120, for that particular layer of material to be removed.

The constant Z distance between parallel, horizontal lines defines a constant layer thickness. This layer thickness corresponds to the roughness of the surfaces exposed upon laser removal of the material. In this case the exposed surface is the inside hemispherical surface 160 of the dome graphically defined by the slope line curvature 300. The greater the distance between the horizontal parallel lines, the greater the roughness of the surfaces exposed after laser engraving and vice versa. This surface roughness is graphically depicted in FIG. 3 by the small, triangular section, e.g. 400 which is between the slope line 300 and the first full square or laser starting point for each layer. Thus, a decrease in the area of this triangular section increases the smoothness of the resulting exposed surface. To decrease the area of this triangular section the thickness of each layer is decreased.

It is understood that the FIG. 3 drawing depicts only one-half of the dome. A complete FIG. 3 drawing would be a symmetrical mirror image. Thus the last full block in each layer corresponds to the end point of each layer. It is also understood that all the material between the start and end points in each material layer is being removed in this particular dome example. However, the laser need not remove all material in a material layer. The material to be removed depends on the configuration of the three dimensional image to be engraved into block 120.

As above described the thickness of the material layers between the highest and deepest point of the image (120, 130) determines the roughness/smoothness of the exposed surfaces. The number of pieces of artwork to be created corresponds to the number of material layers as each piece of artwork dictates to the laser the material to be removed from that layer. The above graph (FIG. 3) determines the number of pieces of artwork needed as there are 49 material layers between the top most point 120 and the deepest point 130. Greater or lesser layers can be chosen according to the desired smoothness or roughness of the surfaces exposed after the laser engraving.

Each piece of artwork must depict the offset or starting point of the laser for that layer relative to the starting point 120 or the immediately preceding superior layer. This starting point offset is the X distance between the circle 120 and the start point for each subsequent layer as above determined. The offset between layers can also be calculated by subtracting the corresponding X distance. The artwork presented will be a series of circles having a reduced radius corresponding to the X distance or offset between the point 120 and the start point of each layer. In this case the first drawing will be a circle having a radius reduced by 0.0022" as that is the distance between the start point 120 and the start point of the first layer. This plurality of reduced circle drawings continues with the original radius decreasing by the X distance between the point 120 and start point for each successive layer. Again, the number of pieces of artwork corresponds to the number of material layers that are removed between the block 100 surface and deepest point of the engraving in the workpiece.

On each piece of artwork crosshatching is inserted within the interior of each circle as indicative of the material for that layer to be removed. The laser program software recognizes the crosshatching as laser paths. It is understood that such crosshatching provides for optimum laser paths of material removal. The extent of the crosshatching is dictated by the width of the laser beam. Thus, each successively reduced circle is entirely crosshatched. Upon reading the artwork the software directs the laser along the circumference of each circle and the crosshatching therein.

It is understood that computer programs, e.g., the AutoCAD, or any other similar or compatible software programs, are available to perform this offset/reduction process as well as insertion of the crosshatching therein. In such a case the original circle outline 120 is presented. The user then indicates to the program software a desired contour offset of the circle. The program software will ask how much offset is desired. The user responds by entering into the computer the desired X distance or offset for that material layer. Upon entry the software presents a circle of a smaller radius as reduced by this entered offset. The software then adds the crosshatching as directed by the user. The software thus provides artwork corresponding to the 49 layers of material to be removed from the workpiece 100. Each piece of artwork will be a successively smaller circle having the crosshatching therein.

The plurality of artwork pieces are then placed into the laser computer system in a file format for sequential presentation to the computer program of the laser system. The program software first reads the first drawing corresponding to the top most layer/1. The laser software directs the laser along all lines on this first drawing including the circumference 120 and the crosshatch lines therein. Thus, the first layer of material is removed. As each sequential, piece of artwork is presented to the program software, the laser removes the material in the workpiece corresponding to the circumference outline of the reduced circle and crosshatch lines therein. This process occurs for each piece of subsequent artwork corresponding to subsequently inferior/deeper material layers to be removed from the workpiece 100. This process continues until the laser reaches the last layer 49 of artwork which contains the deepest point 130 of the image to be engraved, i.e., the apex/vertex 130 of the sphere.

Initially, the power of the laser is set so as to penetrate the chosen thickness of each material layer. As each sequential piece of artwork is presented, the laser will penetrate deeper into the workpiece at such chosen thickness, as the superior layer of block material has already been removed. Thus, the laser always passes through air prior to any material penetration in a chosen layer. Accordingly, the power of the laser need not be adjusted as the superior material layer has already been removed by a previous laser pass along the workpiece.

Figure 4:
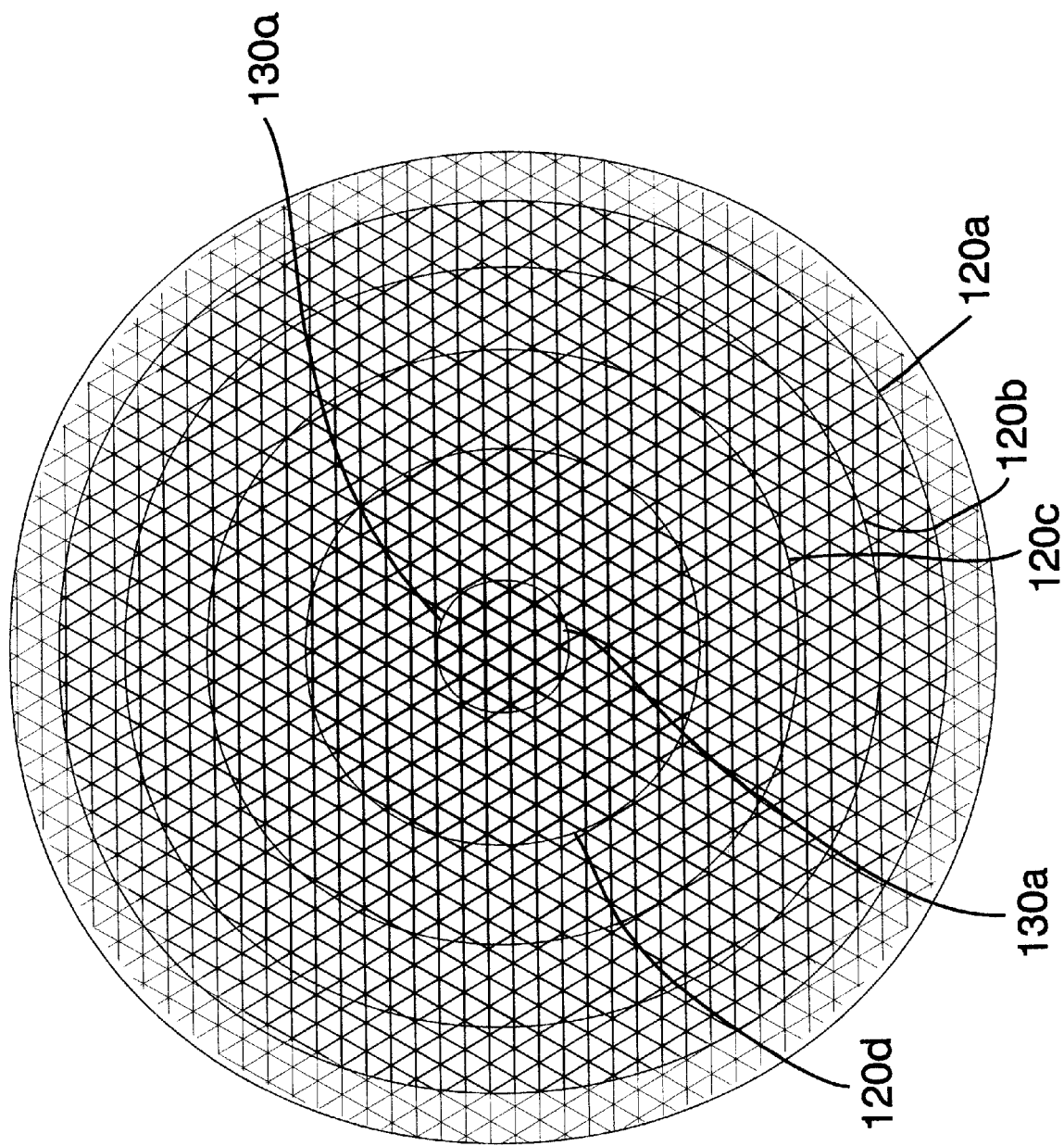
FIG. 4 is a top view diagrammatically depicting a composite piece of artwork utilized in the dome engraving process.

FIG. 4 shows a composite piece of artwork presented to the laser system program for creating this dome engraving. For ease of illustration only, five separate. pieces of overlapping artwork pieces 120a, 120b, 120c, 120d, 130a are numbered rather than the 49 pieces required. Artwork piece 120a corresponds to the top/first layer of material being removed. Artwork piece 130a corresponds to the bottom/last layer of material being removed which contains the deepest point 130 of the dome. Crosshatching has been inserted into each artwork piece within the circular outline of each piece of artwork. As artwork piece 130a includes the deepest point of the pyramid it appears to have the greatest density of crosshatching therein. Such an illustration indicates that the greatest amount of material has been removed from the workpiece to reach that layer. However, this crosshatching density is an accumulation of the crosshatching of the four superior pieces of artwork 120a, 120b, 120c, 120d. Each piece of artwork contains the circular outline and crosshatching therein for material to be removed by the laser for the particular layer corresponding to that piece of artwork. The distance between the circular outline of each piece of artwork will be the offset distance between layers as determined by the X distance between vertical lines shown in FIG. 3.

Figure 5:
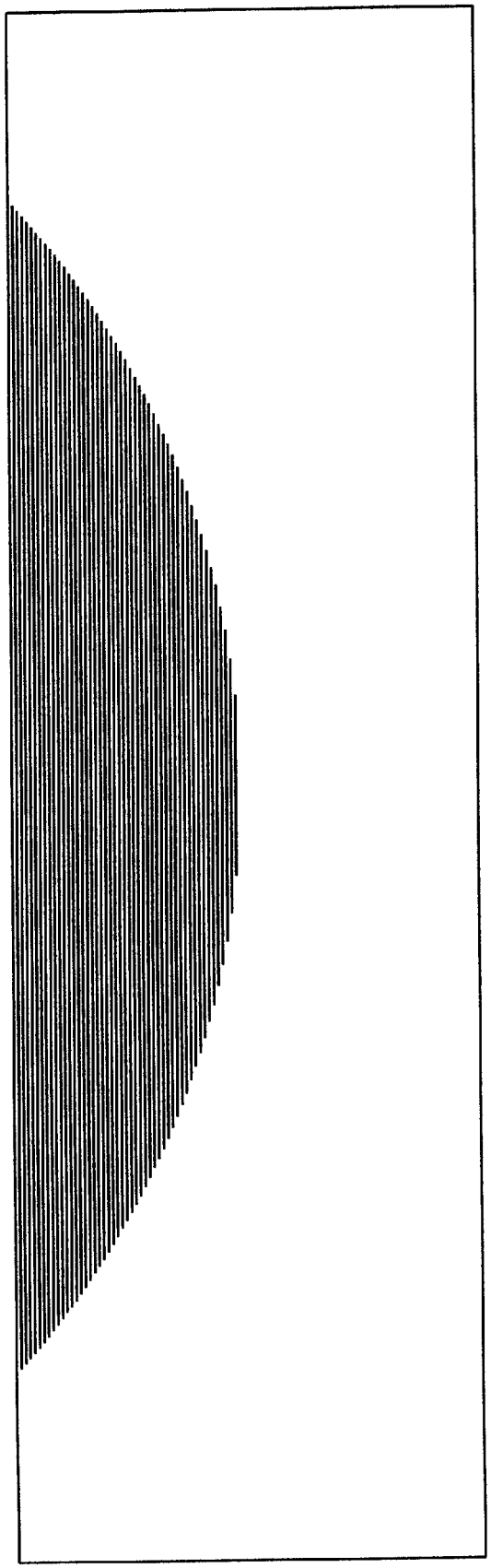
FIG. 5 is a central side view of the workpiece of FIG. 2 diagrammatically showing the layers of material in the workpiece for removal.
Figure 6:
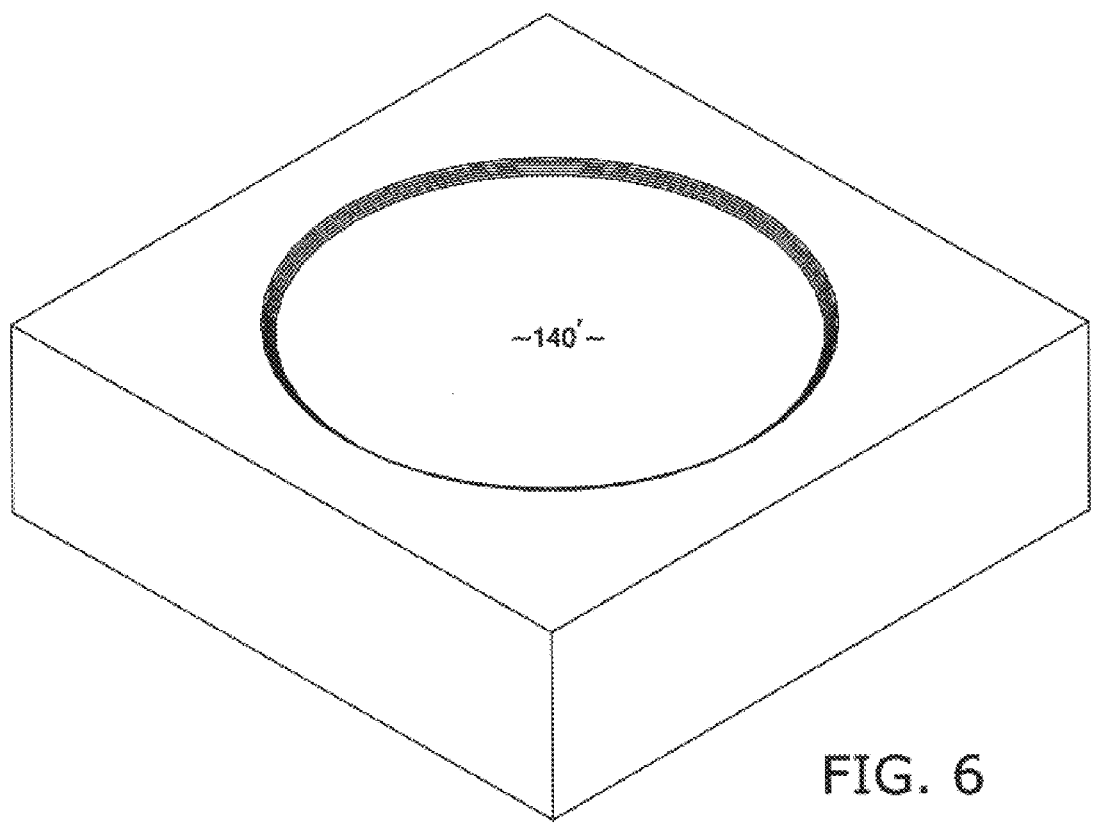
FIGS. 6–11 show the progressive removal of layers from the workpiece for arriving at the FIG. 2 dome engraving.
Figure 7:
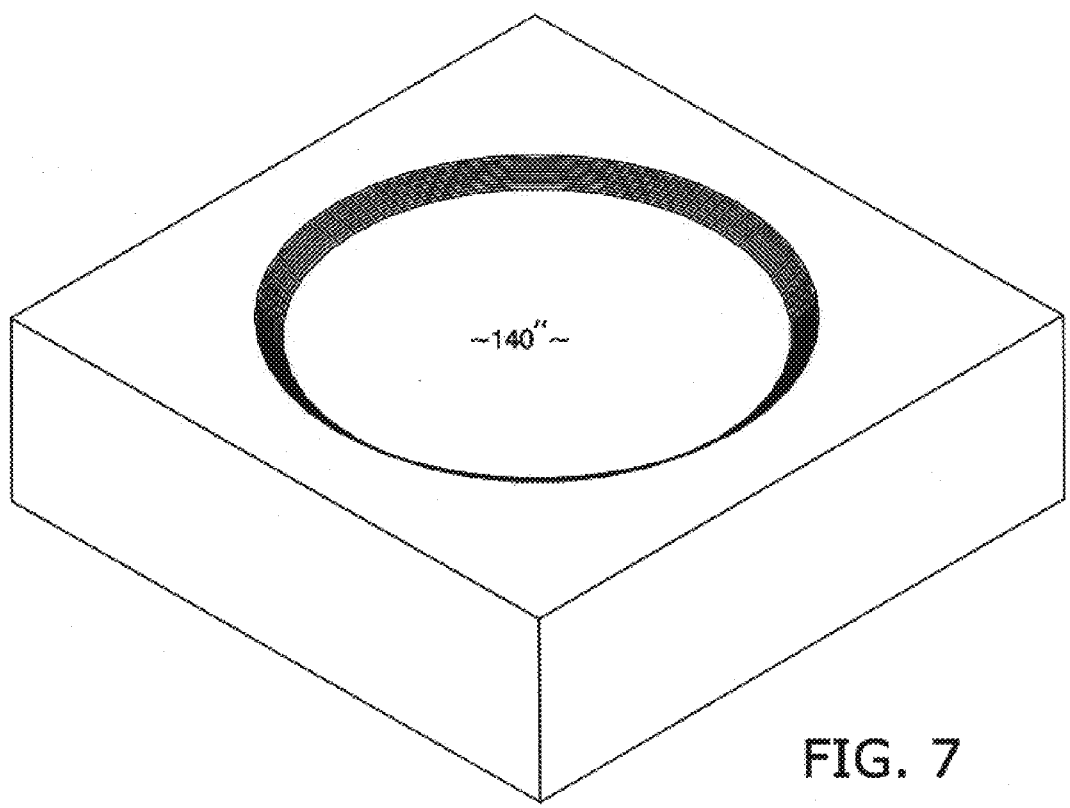
Figure 8:
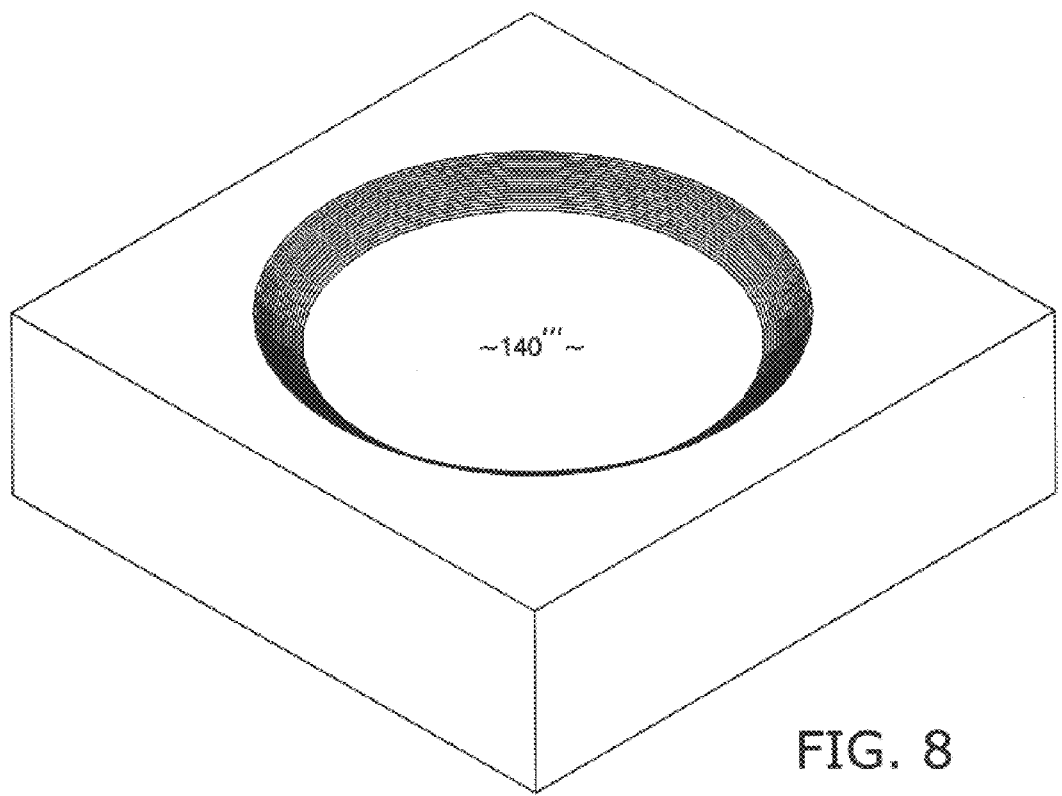
Figure 9:
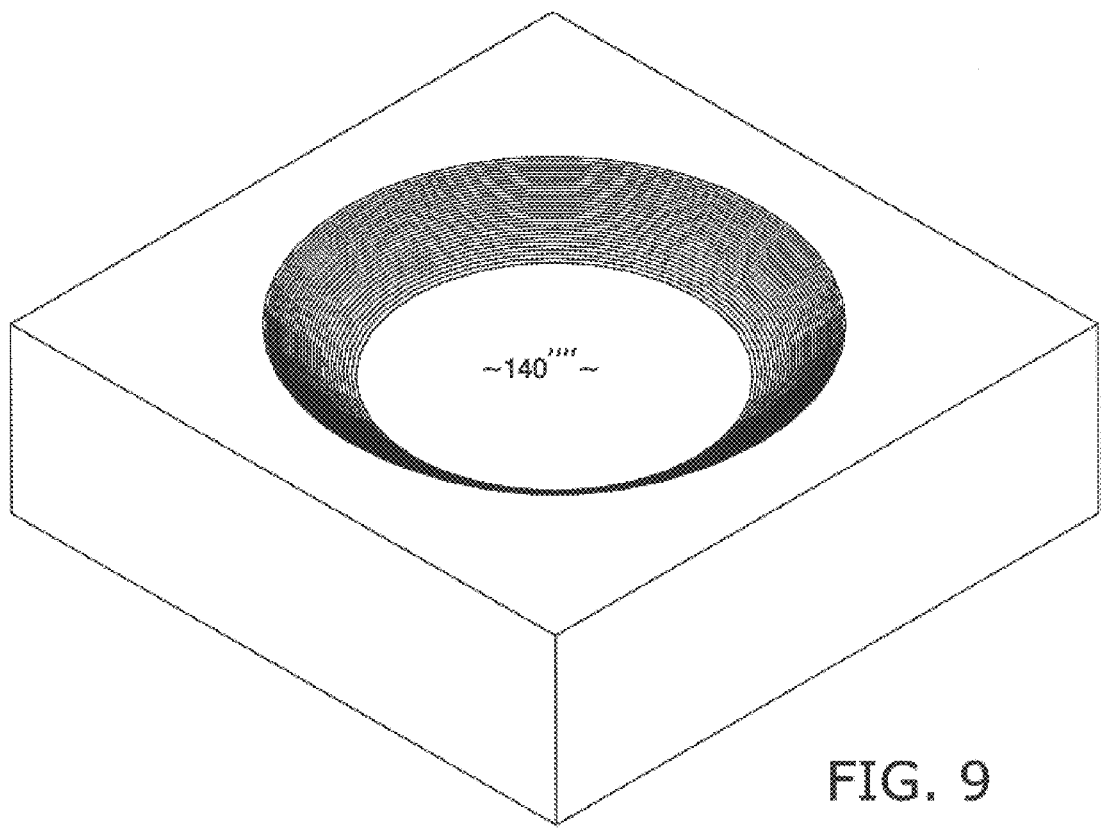
Figure 10:
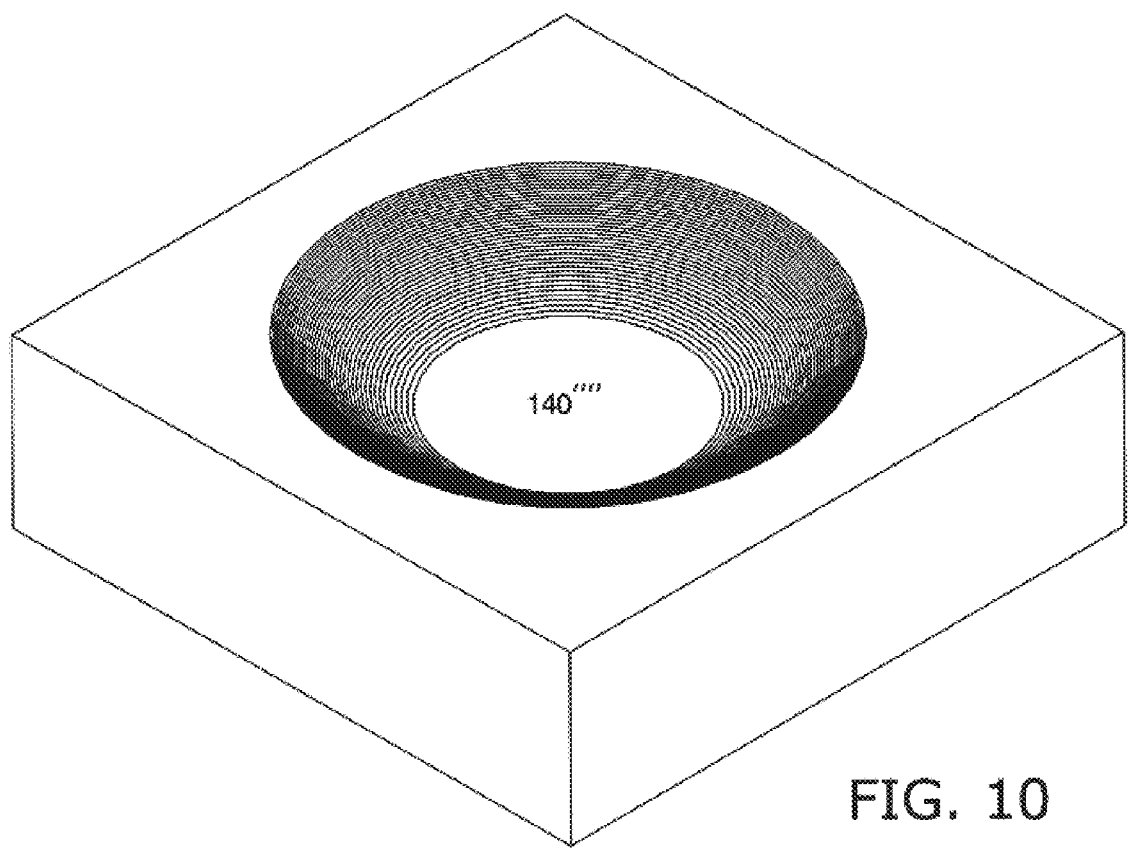
Figure 11:
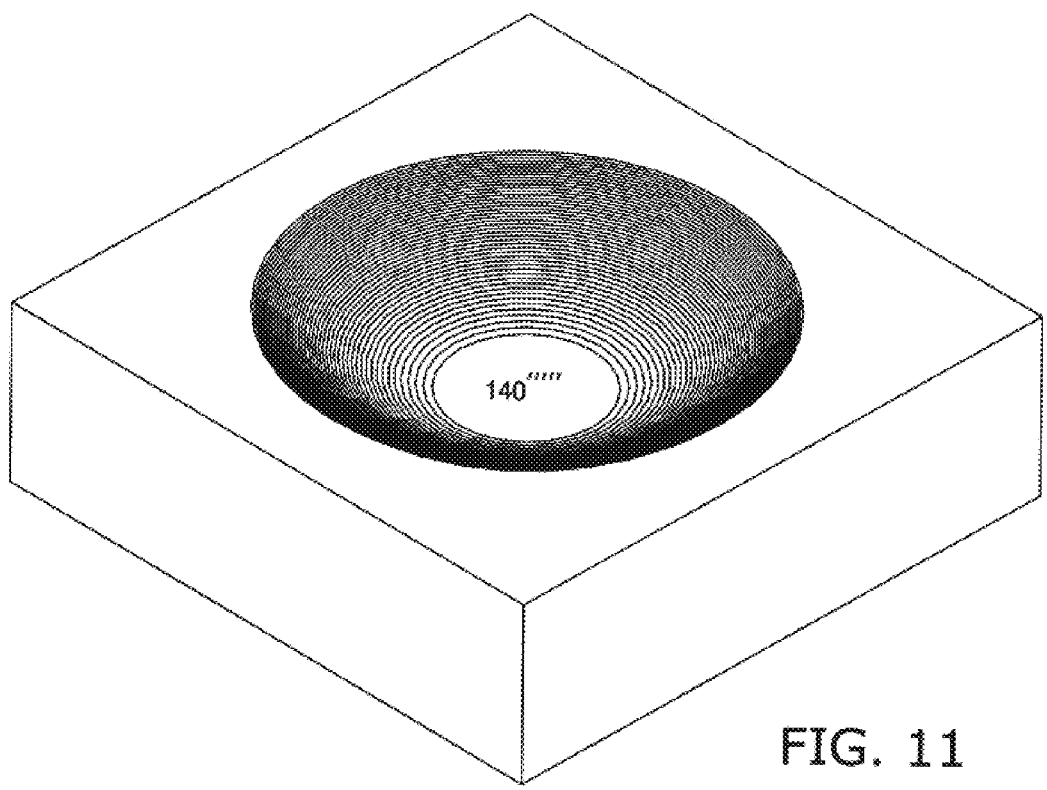

FIG. 5 diagrammatically shows a cross section of the material layers for the dome (49 layers have not been shown for ease in illustration). FIGS. 6–11 illustrate the progressive removal of material layers from the workpiece between the block of FIG. 1 and the vertex of FIG. 2. (More than one layer has been removed in each drawing.) The designations 140', etc. show material still to be removed from the workpiece 100. FIG. 2 shows the final engraving of the dome into the workpiece.

As above stated each resulting engraving will have a resulting roughness/smoothness corresponding to the number of layers of material removed to present the full engraving. Thus, subsequent polishing of the exposed surfaces, e.g., the exposed interior surface (FIG. 2) of the dome, may be required.

Figure 12:
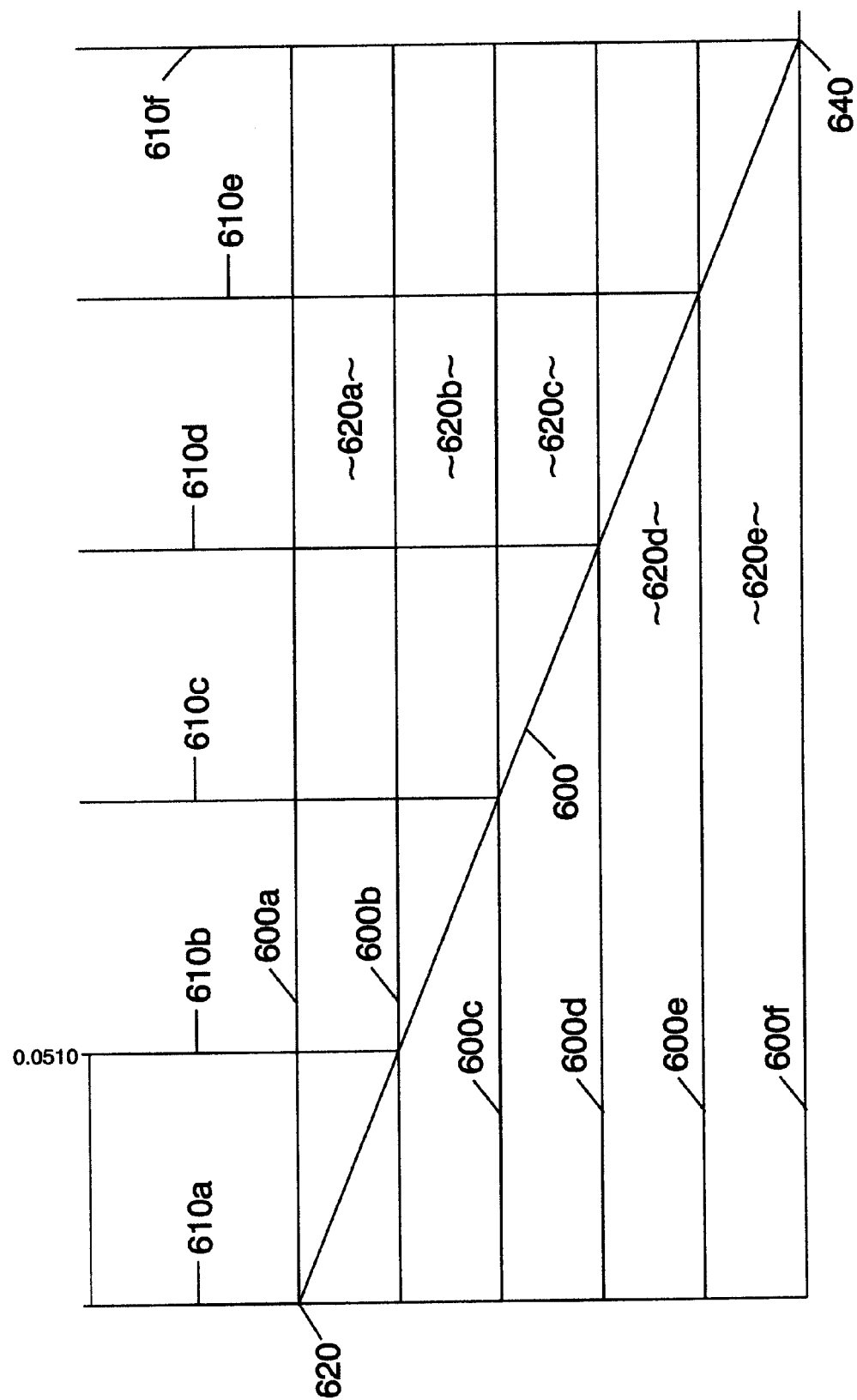
FIG. 12 illustrates a basic X-Z grid and slope line thereon utilized in the method for engraving a pyramid into the workpiece.
Figure 13:
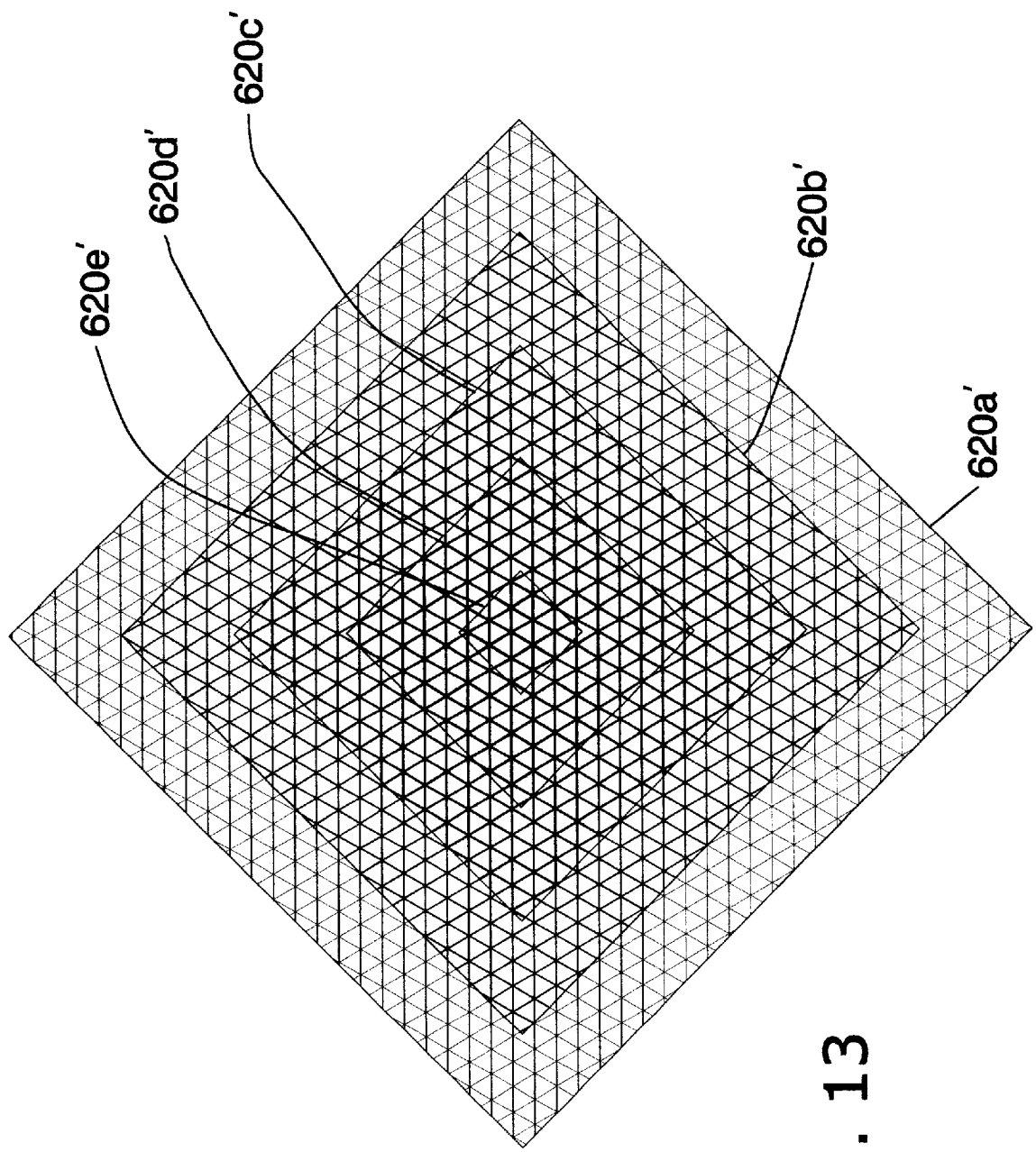
FIG. 13 is a top view diagrammatically showing a composite piece of artwork utilized in the pyramid engraving process.
Figure 14:
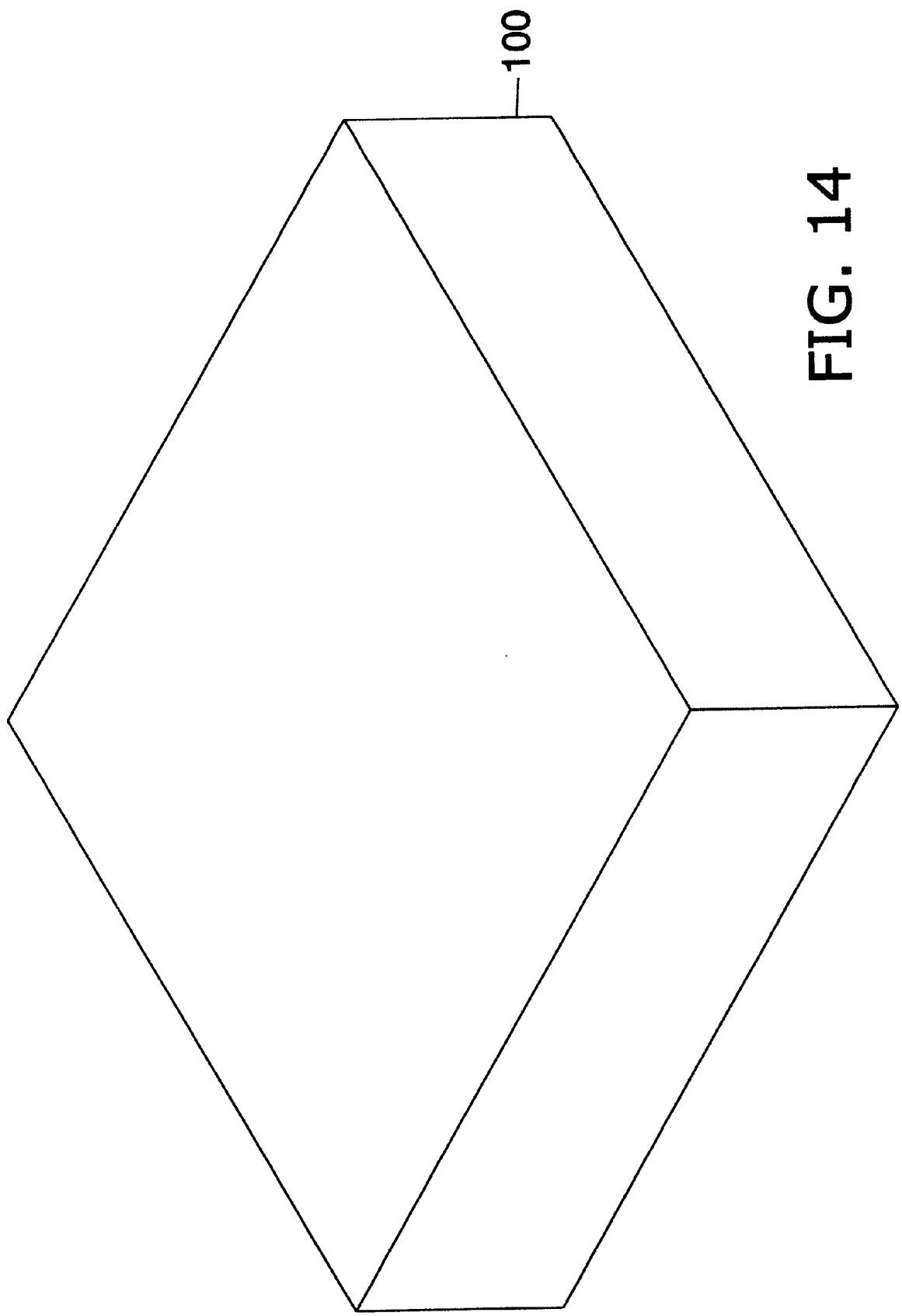
FIGS. 14–21 show the progressive removal of layers from the workpiece for the pyramid engraving.
Figure 15:
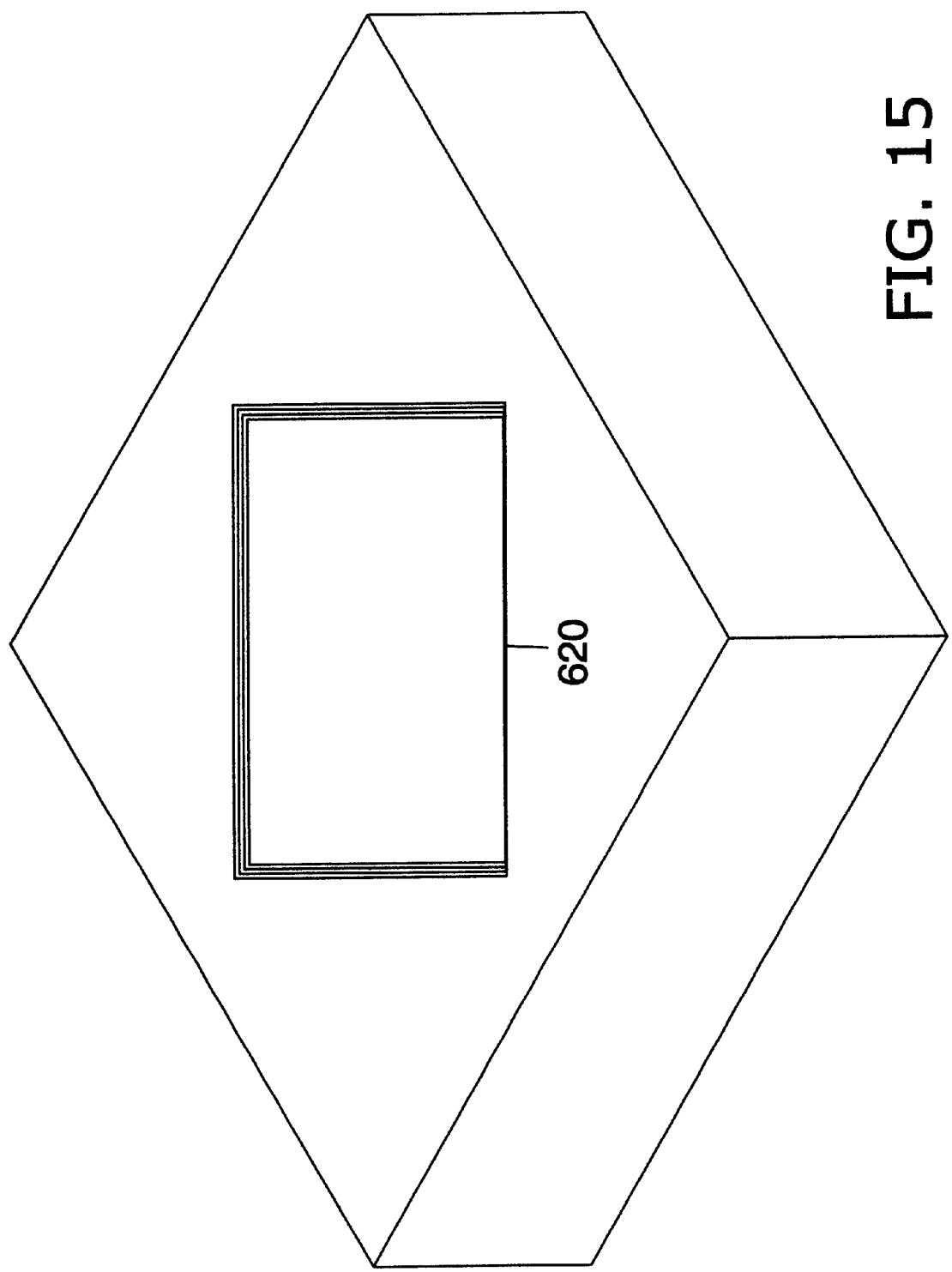
Figure 16:
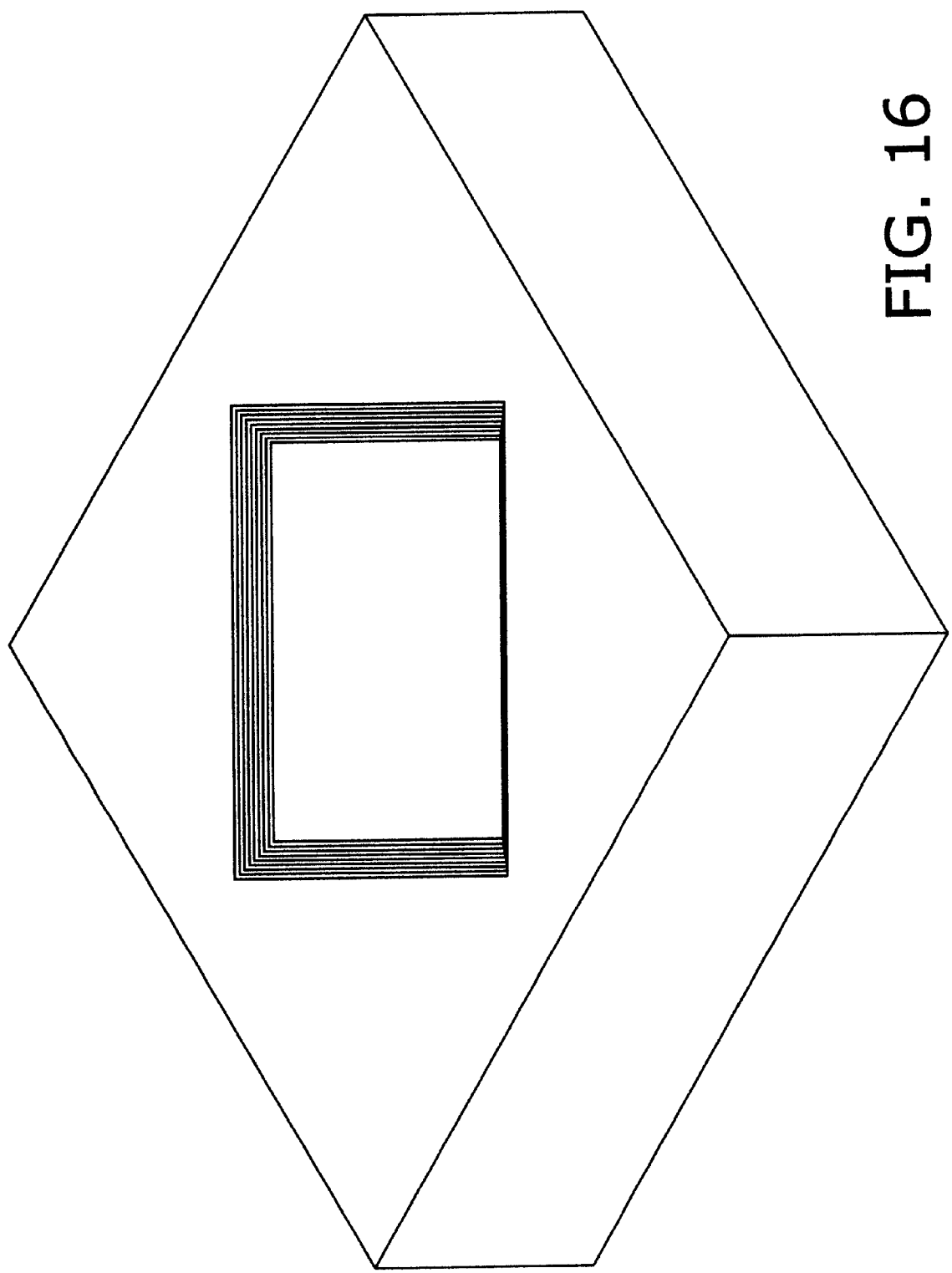
Figure 17:
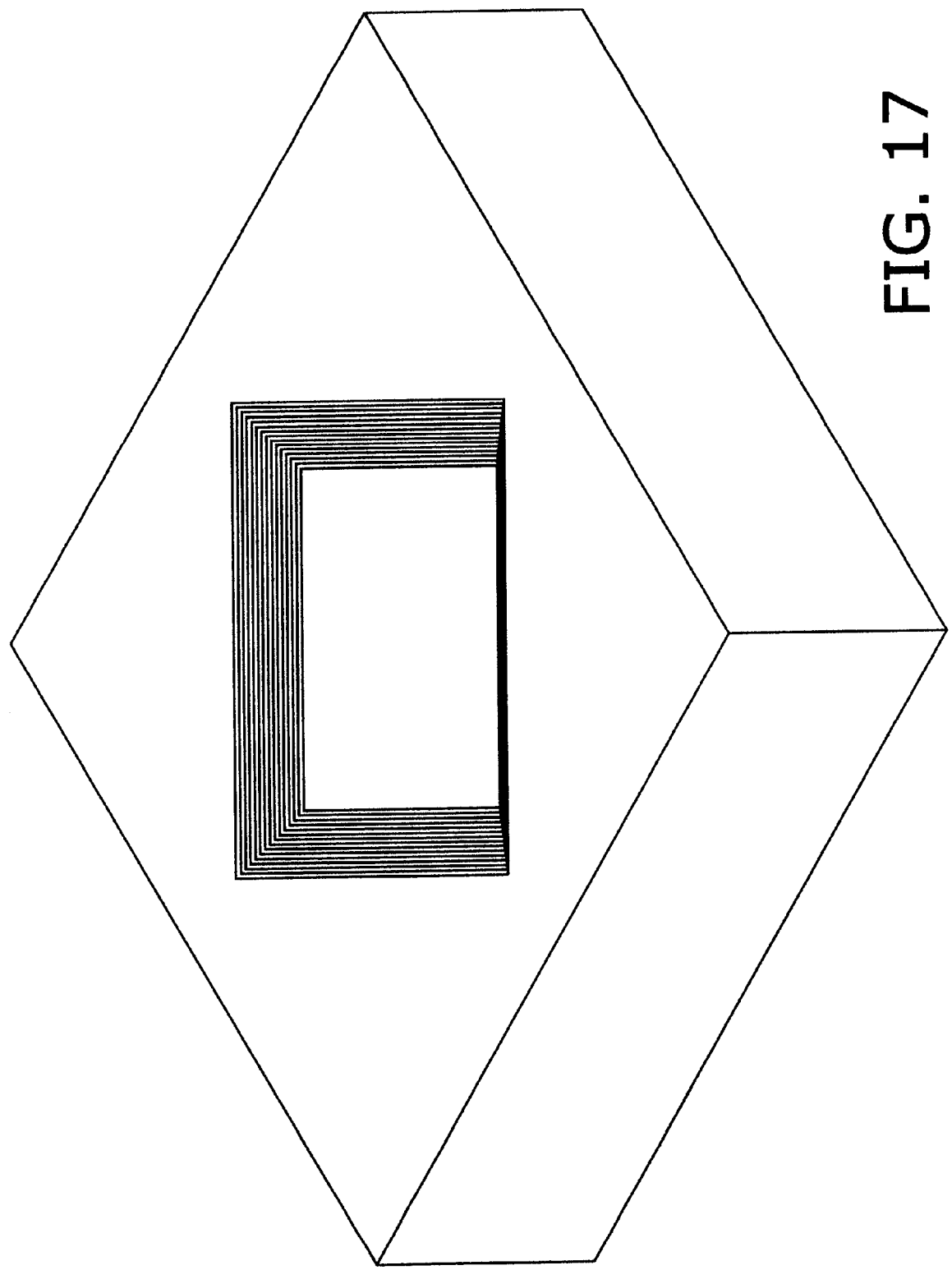
Figure 18:
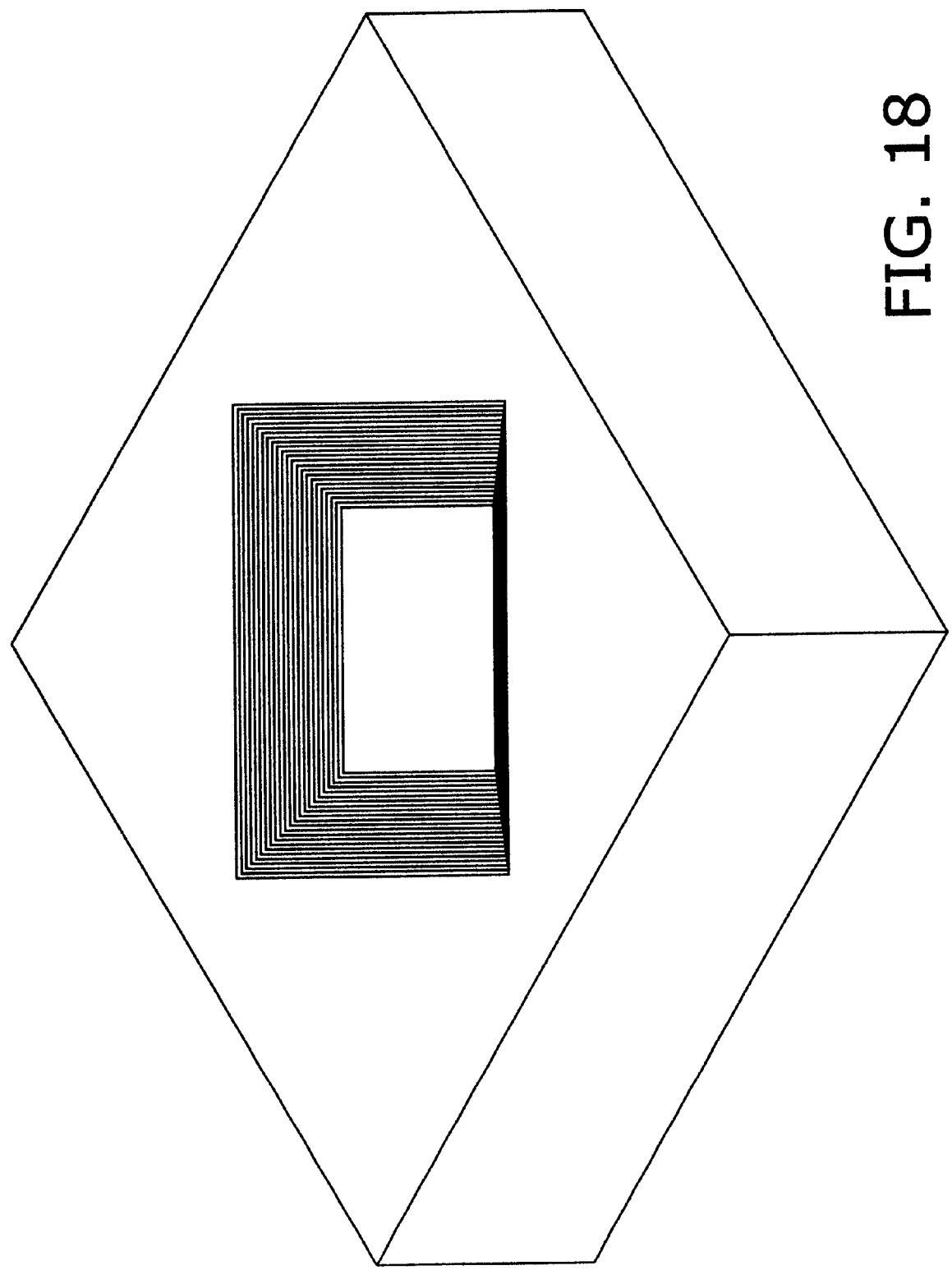
Figure 19:
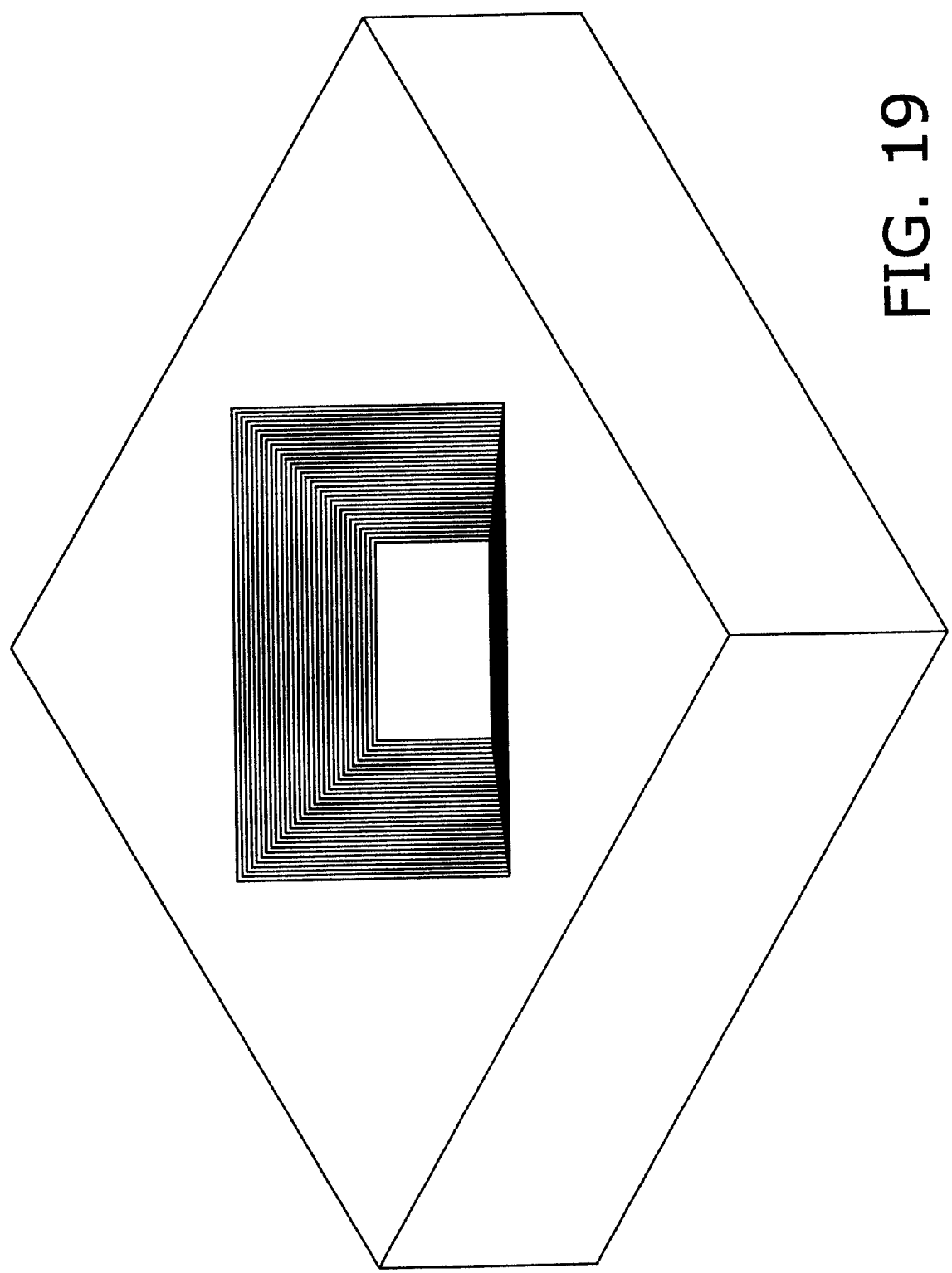
Figure 20:
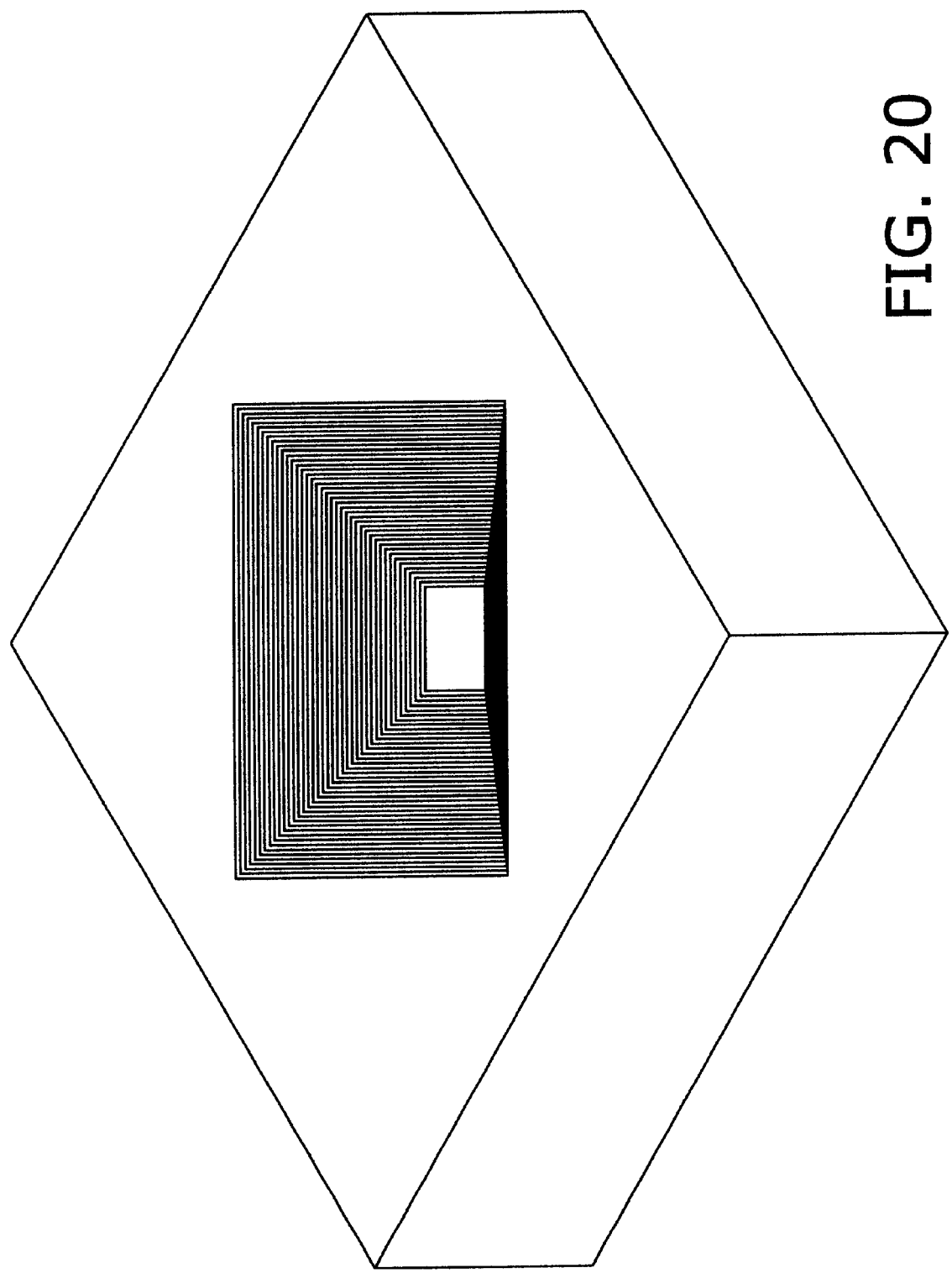
Figure 21:
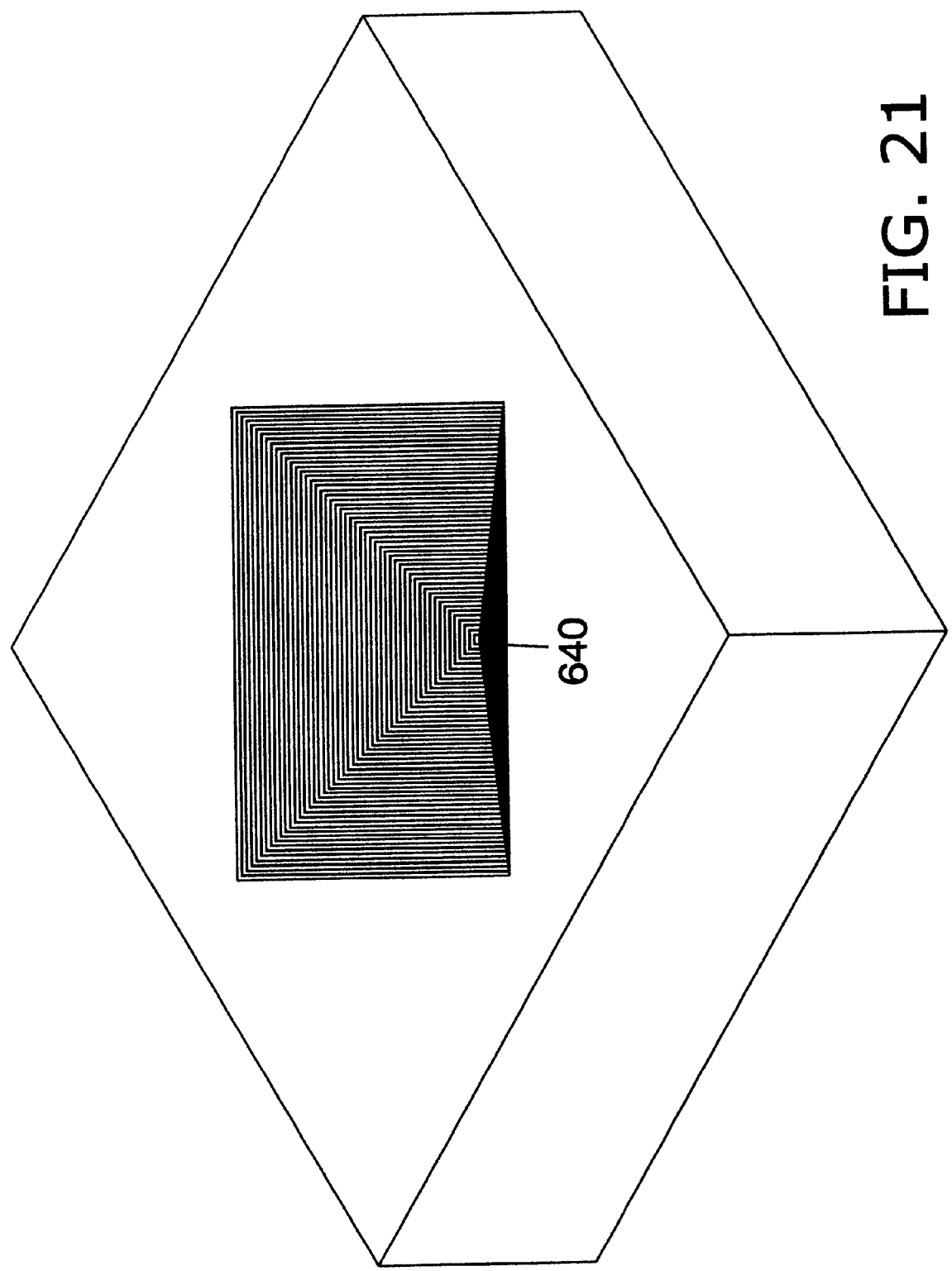
Figure 22:
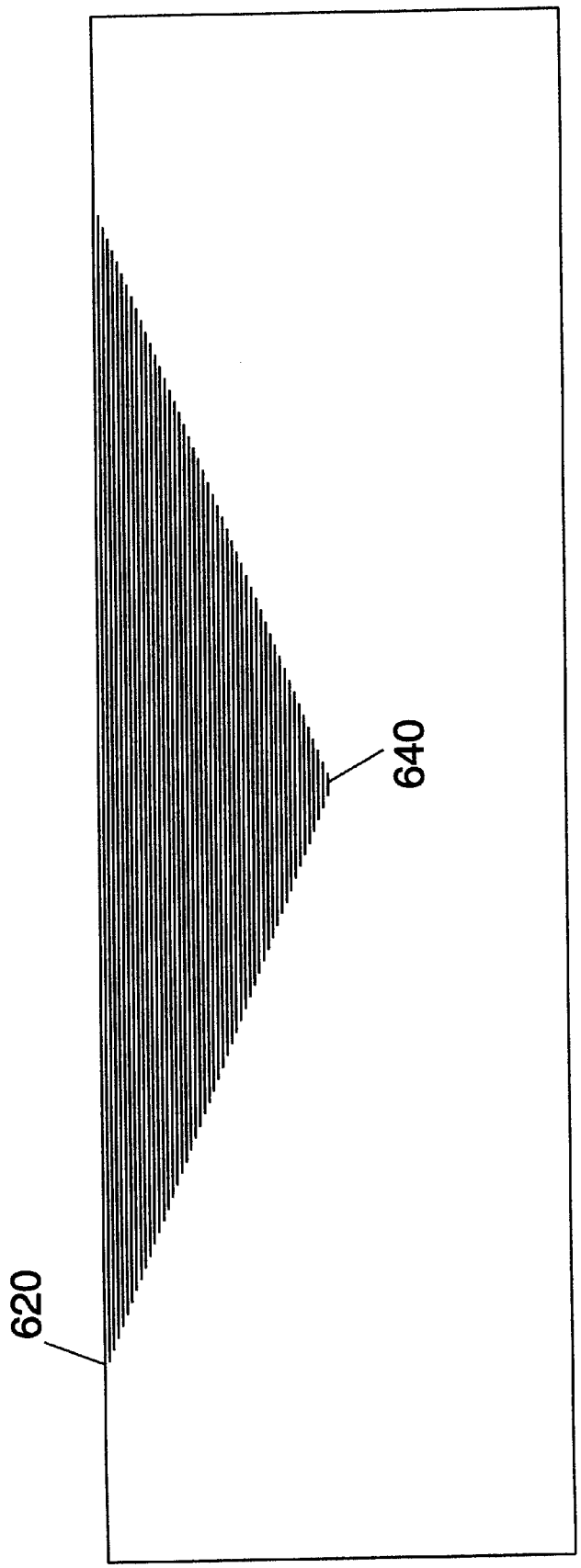
FIG. 22 is a diagrammatic central side view of the block showing the layers to be removed from the block.

FIG. 12 shows on an enlarged scale the parallel X-Z grid for engraving a pyramid into the workpiece. The constant distance between the parallel lines corresponds to the thickness of each material layer to be removed. The slope line 600 extends between the top surface of the workpiece and the vertex 640 of the pyramid. Again, vertical normal lines 610a–f are drawn to the intersection of each parallel line 600a, 600b, 600c, 600d, 600e, 600f and the slope line 600. The distance between line 600a and the subsequent vertical lines are indicative of X distances or offsets from the point 620. This distance is the starting point of the laser for that material layer defined by a pair of horizontal parallel lines. Thus, an offset X distance can be determined as above described. Once presented the pieces of artwork for each material layer can be created utilizing this offset. The composite artwork is shown by five pieces of artwork 620a'–620e' corresponding to each material layer, are shown in FIG. 13 and crosshatched as above described. The corresponding layers have been labeled as 620a–620e in FIG. 12. The successive removal of material from the block 100 is as shown in FIGS. 14–22 so as to form an inverted pyramid within the workpiece. (It is noted that FIGS. 14–22 show more than five layers being removed to create the pyramid in the workpiece.) Again, there must be a corresponding number of pieces of artwork for each layer of material to be removed so as to provide for this layered process.

Figure 23:
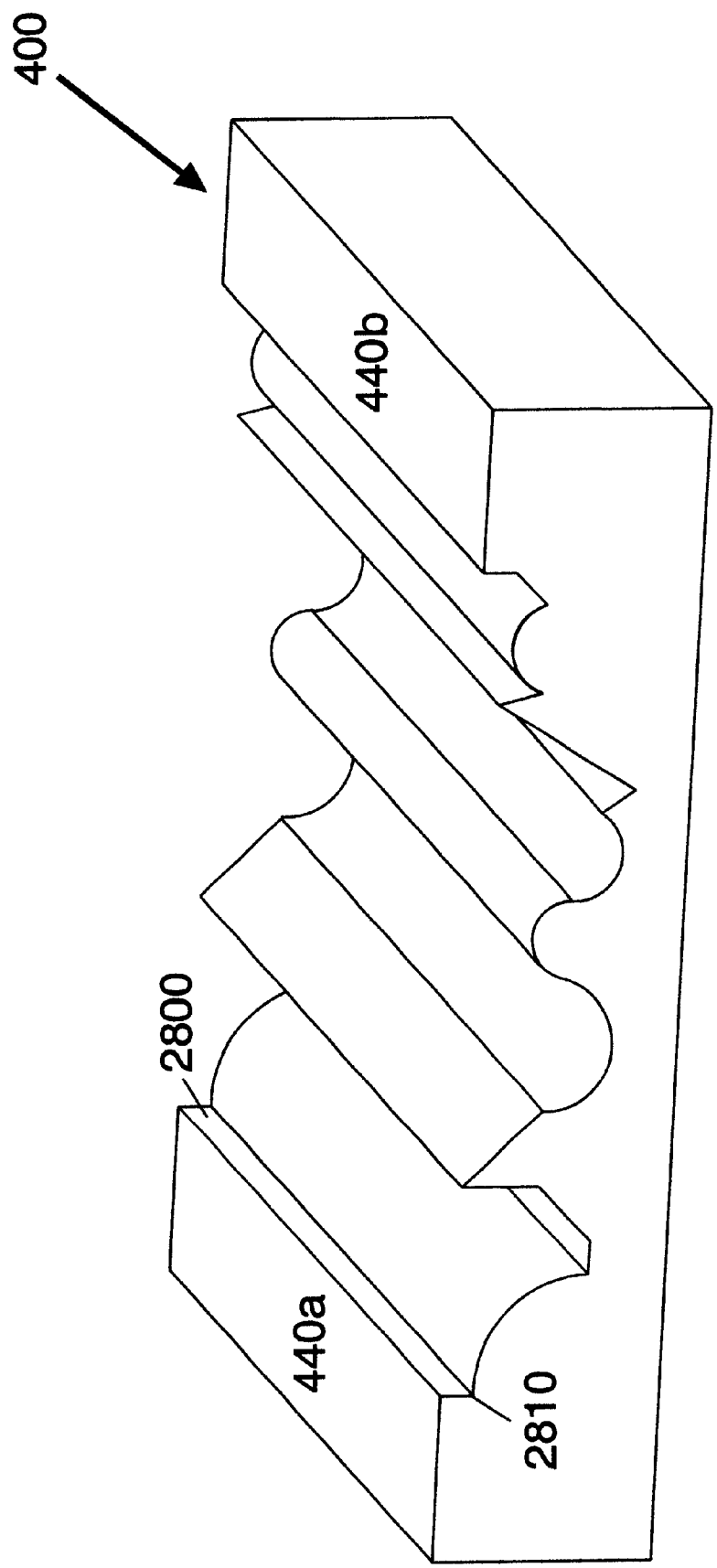
FIG. 23 shows a workpiece having various contours at various depths engraved therein.

It is understood that the above examples show a basic dome and pyramid having its deepest point in the center thereof. Thus, the engraving and drawings are symmetrical about a centerline. Such figures have been used for ease in illustration. Moreover, in such cases all material in each layer is being removed. Thus, crosshatching extends between the circular outline or square of each piece of dome or pyramid artwork. However, various three-dimensional images can be engraved into a workpiece utilizing my method. These images can have various depths, contours, etc. therein and need not be symmetrical about a central point. Thus, my method is not to be limited by the simplicity or complexity of the engraving. For example, FIG. 23 shows a workpiece 400 having various slopes, undulations, and configurations therein. Moreover, not all the material in each layer has been removed. For example, the topmost surfaces 440a, 440b of block 400 has not been removed. This engraving can be performed by utilizing my above-described process. Each piece of artwork will have crosshatching and lines thereon indicating material to be removed from that layer. However, the artwork will not be fully crosshatched as all material is not being removed in each layer.

Figure 24:
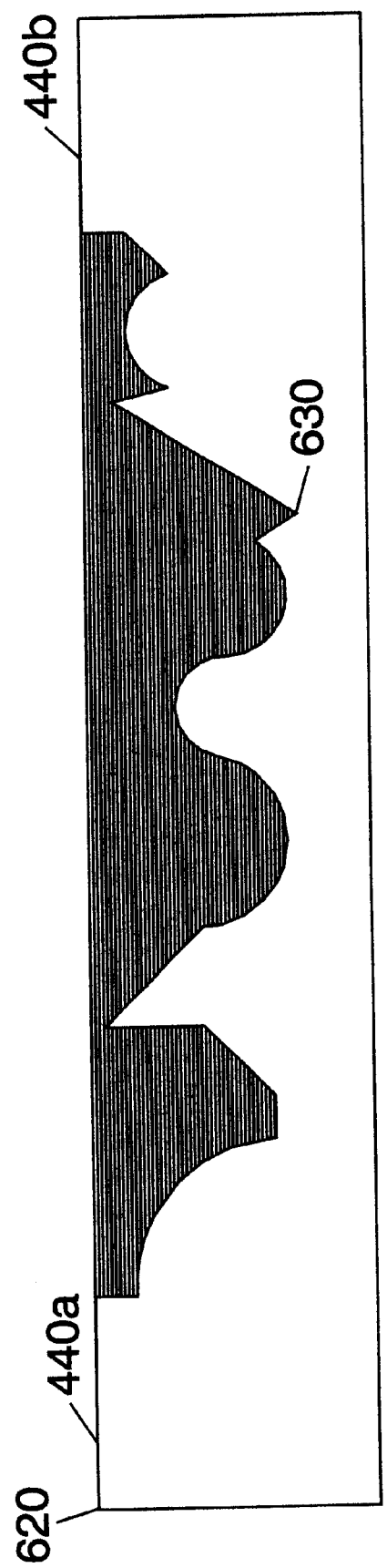
FIG. 24 shows a side view of the FIG. 23 block showing the number of material layers to be removed therefrom, as well as selected vertical lines extending therefrom for depicting the X offset therebetween.
Figure 25:
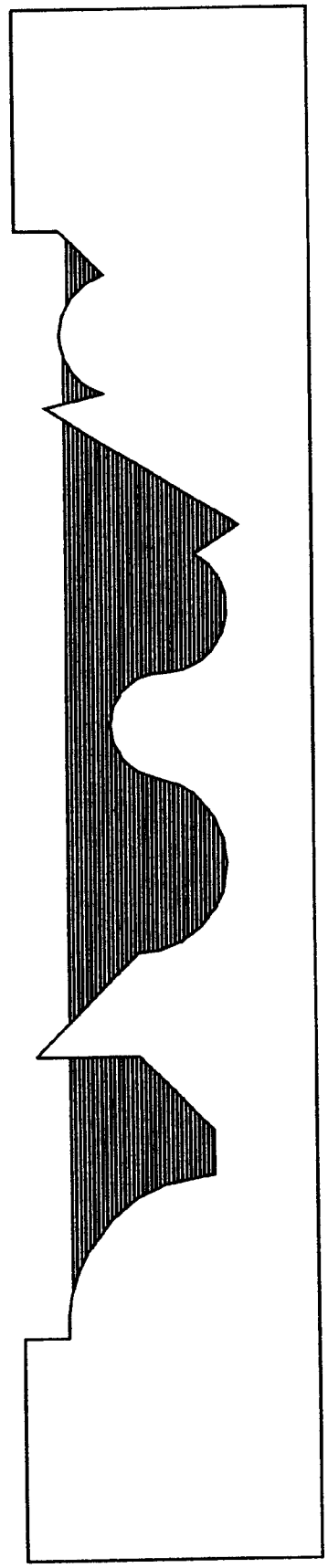
FIGS. 25–28 show the progressive removal of material layers from the workpiece to arrive at the FIG. 23 engraving.
Figure 26:
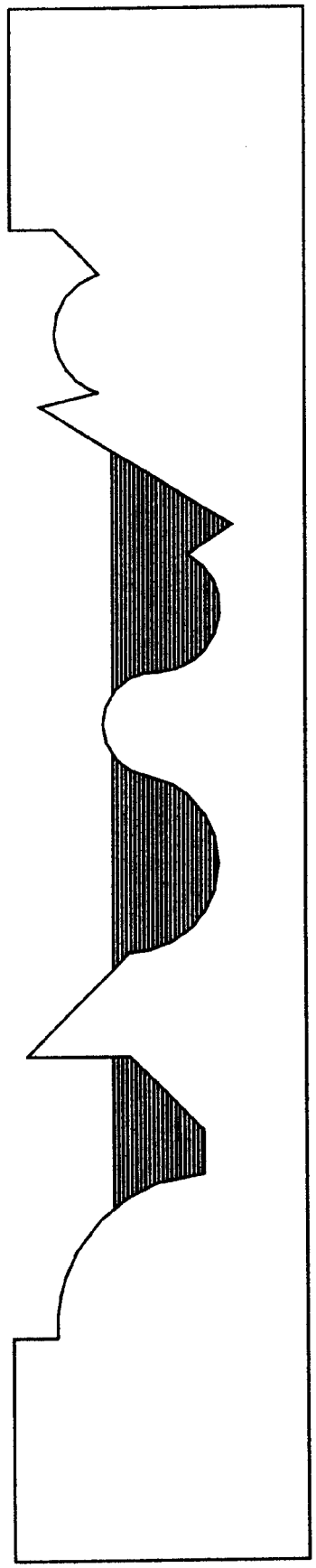
Figure 27:
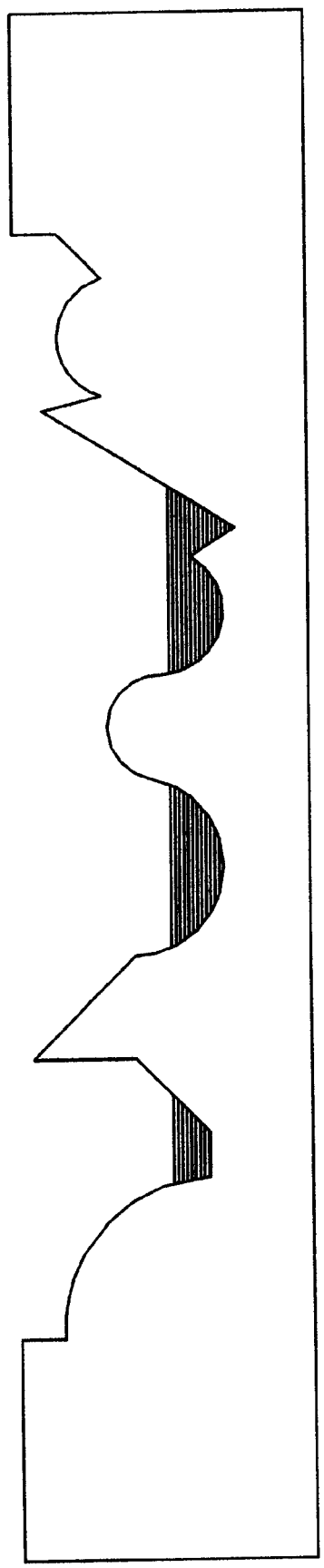

As shown in FIG. 24, a grid having a number of parallel lines of constant spaced-apart dimension is provided. The slope angles utilized will be the slopes of the various undulations, contours, etc. as shown in FIG. 24. Vertical normal lines will be drawn to each intersection of the parallel lines and the slope therein. (Not all vertical lines have been shown in FIG. 25.) Thus, the X distance, or contour offsets, can be determined as above described.

When utilizing the computer a top view of the block will be shown. For each subsequent layer of material the determined offset is entered which will provide a top view reduced by this offset. Crosshatching is then added to indicate the material to be removed for that particular layer.

Once these pieces of artwork are present and crosshatched, they are presented to the laser system software which sequentially reads the drawings and guides the laser along the workpiece according to the drawings in a layer by layer manner. FIGS. 24–28 diagrammatically show the removal of layers so as to arrive at the FIG. 23 block.

Figure 29:
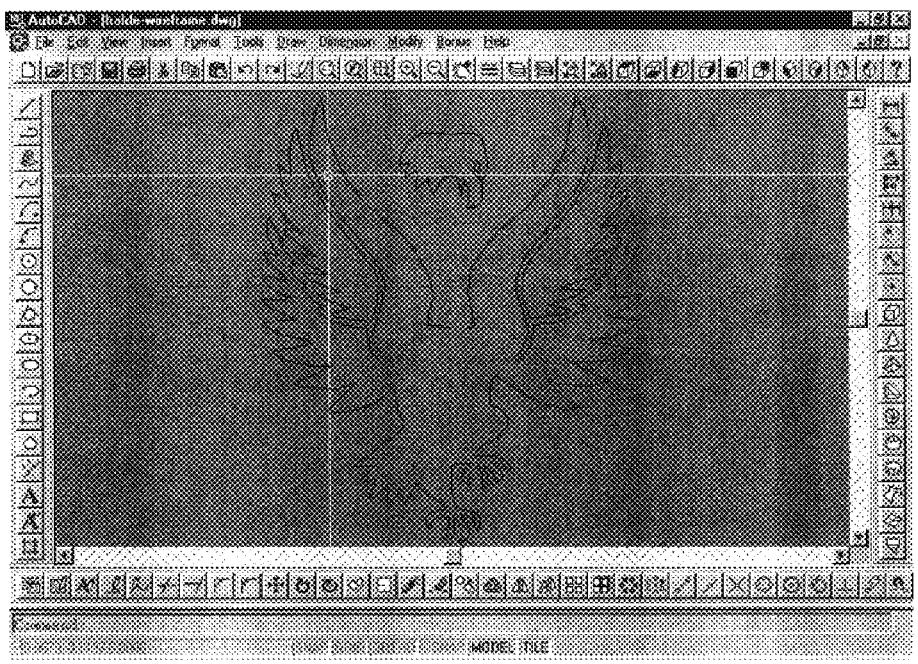
FIGS. 29–34 show the above process as implemented and on a computer system for forming the body of an eagle engraving.
Figure 30:
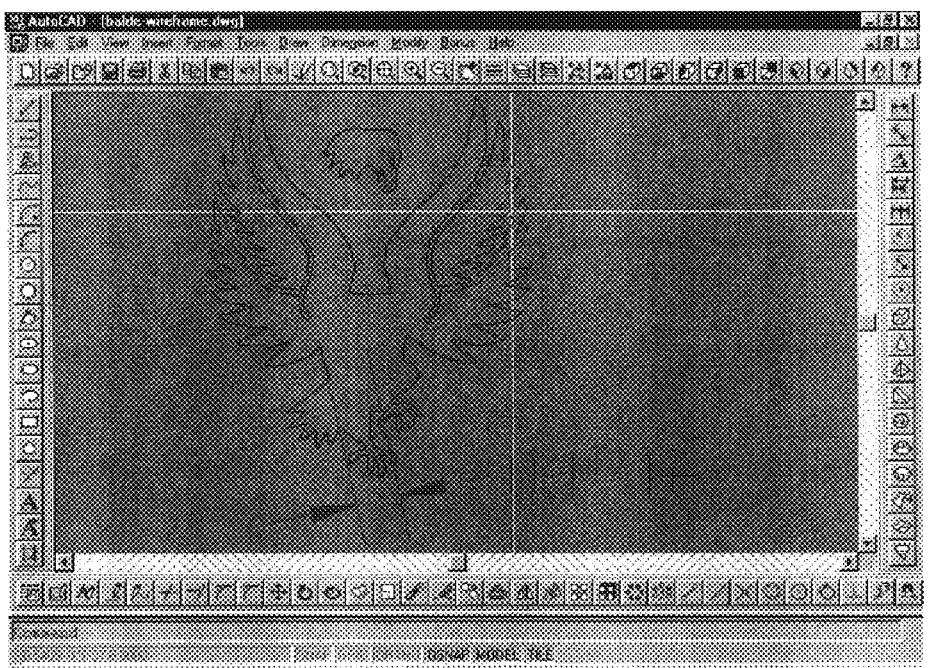
Figure 31:
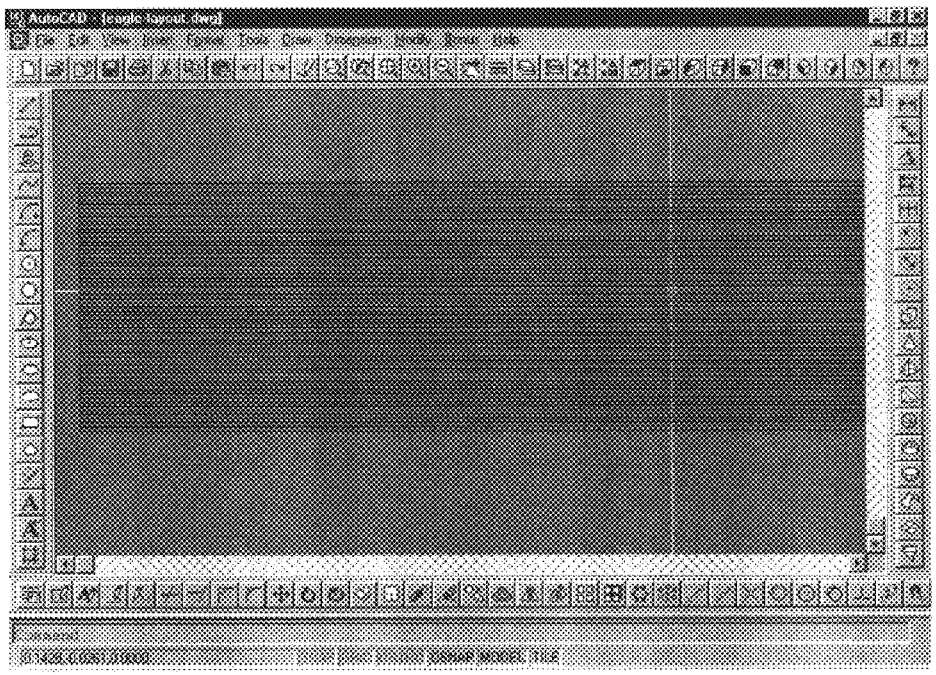

FIGS. 29–39 show the procedure for an eagle engraving into the workpiece in a computer environment. FIG. 29 shows the outline of the body of the eagle. A dimension has been selected from the surface of the eagle to its deepest point in FIG. 30. FIG. 31 depicts the plurality of horizontal, parallel lines corresponding to the layer thickness.

Figure 32:
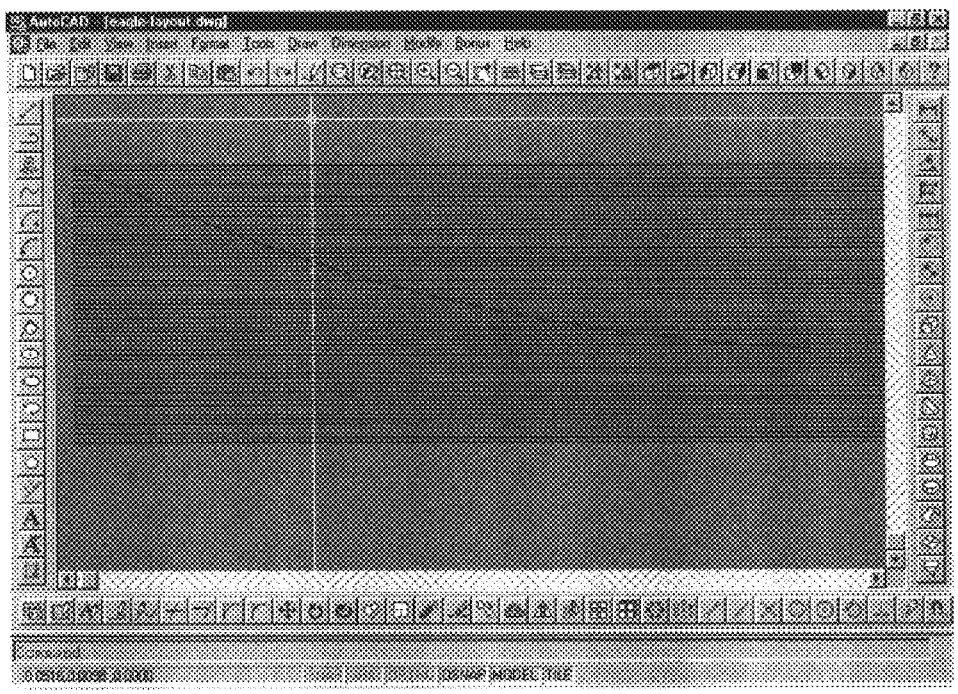
Figure 33:
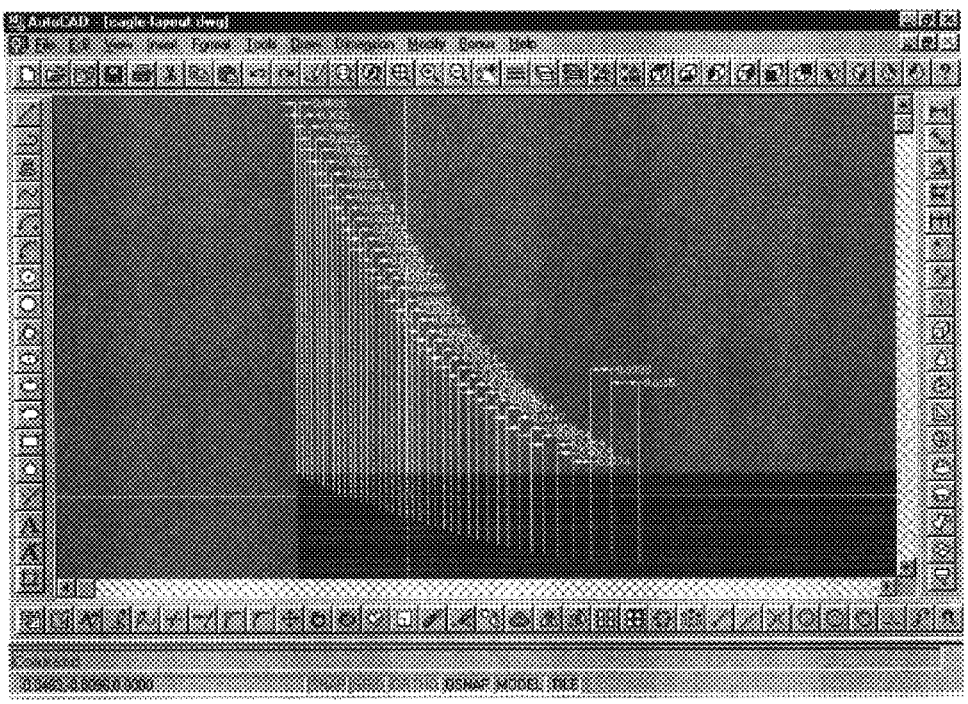
Figure 34:
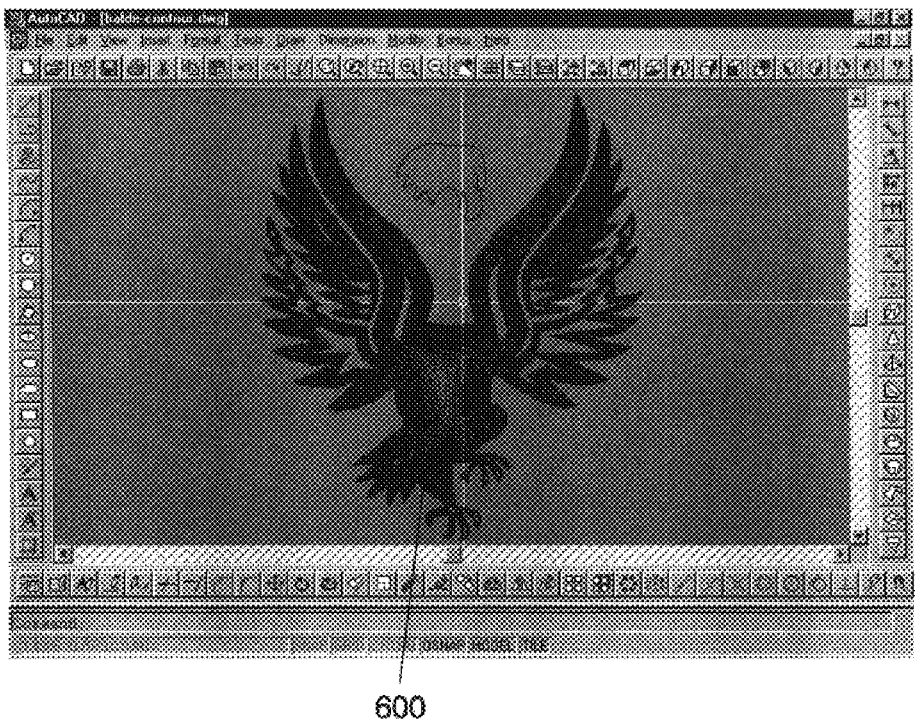

FIG. 32 shows the desired slope between the outside outline of the eagle and its deepest point. (As the eagle is symmetrical about the chosen deepest point only one-half of the X-Z grid is chosen.) FIG. 33 shows the X offsets that have been calculated by the computer between the vertical lines normal to the intersection of each horizontal line and the slope line shown in FIG. 32. These offset distances are utilized for the contour offsets to be subsequently entered. FIG. 34 shows the eagle outline. Note the contour offset lines 600 in the breast of the eagle. The contour offset process will provide a plurality of eagle breast outlines of reduced configuration corresponding to the calculated offsets. Crosshatching will be inserted within the breast outline in each drawing to indicate what material is to be removed for that particular layer. The number of artwork pieces created to form the composite eagle image will correspond to the number of layers chosen as depicted in FIG. 32. The use of the contour offsets will present a first breast image in a superior layer and a second reduced image in the inferior layer with an exposed slope surface therebetween. This breast will be engraved into the workpiece with a sloped surface being exposed.

As above described, the pieces of artwork forming the composite eagle image are then presented to the laser system computer software. For the first layer of the workpiece, the first piece of artwork at a first set of dimensions will be presented. The laser software translates the lines on this first piece of artwork, including the crosshatch lines inserted thereon into signals corresponding to laser paths. Upon receipt of these signals, the control assembly directs the laser beam along the workpiece in correspondence with these laser paths to remove material from the layer of the workpiece.

For the second layer of material removal a second piece of artwork is presented. If the whole engraving or portions thereof are to have sloped surfaces between layers the offset is determined. These image portions are to be reduced/offset relative to the preceding or superior layer. The offset is determined by reference to FIG. 33 and the offset process for each layer as above described.

Once the offset with crosshatching is entered, the artwork to be engraved into the corresponding layer of the workpiece is then presented. The selected portions on the artwork are reduced by the dimension corresponding to this offset dimension. The appropriate crosshatching is inserted to designate material to be removed. This piece of artwork having the reduced/offset images thereon is then presented to the laser system computer software. The software translates the lines on the artwork piece to laser paths for laser beam removal of the material from that layer. As the dimensions for a particular portion of the image have been offset or reduced from the previous dimensions utilized in the superior layer, a slope is presented in the engraving between adjacent superior and inferior layers, the slope being shown in FIG. 37. This process of presenting subsequent pieces of artwork for each subsequent inferior layer and offsetting selected portions thereon is repeated until the deepest point of the engraving has been completed.

Figure 28:
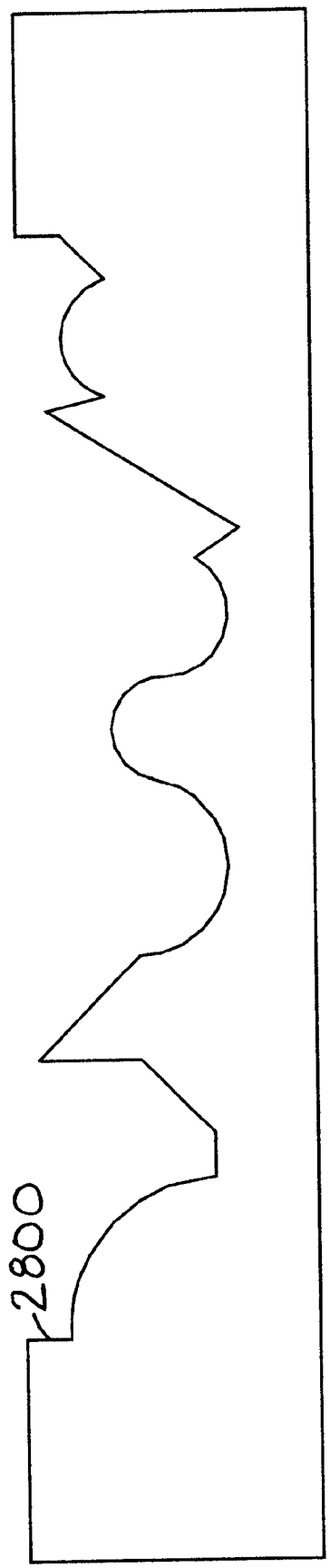

It is understood that there may be portions of the image engraving which is vertical, i.e., not sloped from the 90° vertical between layers. In this case the dimensions for that particular portion of the image is not offset/reduced but stay the same relative to the preceding/superior artwork piece. Such a situation is shown in FIG. 28 at line 2800 as the slope of that portion of the engraving is at the vertical between adjacent superior/inferior layers. For that particular portion of the artwork no offset of the lines on the corresponding artwork is made. However, for those portions of the engraving image which are to be sloped the above offset is utilized. Thus, the subsequent pieces of artwork corresponding to inferior layers may contain image portions thereon which have been reduced in dimension by the offset. The offset occurs according to whether the images engraved into the superior/inferior layers have sloped surfaces therebetween.

It is understood that the above artwork has lines thereon to define the laser paths. However, given my process it is understood that other elements on the artwork may be used to define the laser path, e.g., colors, shades of such colors and the like. Thus, if appropriate, my invention need not be limited to lined drawings.

It is to be understood that while certain forms of this invention have been illustrated and described, it is not limited thereto, except in so far as such limitations are included in the following claims.

Having thus described the invention, what is claimed as new and desired to be secured by Letters Patent is:

1. In a laser system having a laser beam, a control assembly for directing the laser beam along a workpiece, system program adapted to translate artwork into control assembly signals corresponding to laser paths along the workpiece, a method of engraving a three-dimensional image into the workpiece comprising the steps of:

(a) providing a plurality of component pieces of artwork for depicting a three-dimensional image to be engraved into the workpiece, each component piece of artwork having portions of said image thereon to be engraved into a selected layer of the workpiece, each selected layer having a thickness less than the thickness of the workpiece;

(b) designating a first selected layer of the workpiece for penetration by the laser beam, said first layer having a thickness less than a thickness of said workpiece;

(c) designating on a first component piece of said component pieces of artwork portions of the image on said first component piece artwork to be engraved into said designated first layer of the workpiece;

(d) communicating said designated portions on said first component piece of artwork to the system program for translating said designated artwork portions into control assembly signals corresponding to laser paths along the workpiece;

(e) communicating said control signals to the laser system control assembly for directing the laser beam along said laser paths, the interaction of the laser beam with the workpiece removing material from the workpiece in said first layer along said laser paths;

(f) designating a subsequent selected layer of the workpiece for penetration by the laser beam, said subsequent layer adjacent a layer of the workpiece having previously undergone said interaction with said laser beam, said subsequent layer having a thickness less than the thickness of said workpiece;

(g) designating on another of one of said component pieces of artwork portions of the image on said component piece of artwork for engraving into said layer of the workpiece designated in step (f);

(h) communicating said component piece of artwork having said designated portions designated in step (g) to the system program for translating said designated artwork portions in step (g) into control assembly signals corresponding to laser paths along the workpiece;

(i) communicating said control signals to the laser system control assembly for directing the laser beam along said laser paths in step (h), the interaction of the laser beam with said workpiece removing material from said workpiece in said designated layer of step (f) along said laser paths of step (h);

(j) repeating steps (f)–(i) for each subsequent layer of said workpiece until the image is engraved in the workpiece.

2. The method as claimed in claim 1 wherein each said component piece of artwork has lines thereon corresponding to said designated portions of the image on said artwork component piece to be engraved into corresponding designated layer of the workpiece.

3. The method as claimed in claim 2 wherein said step (g) further comprises the steps of:

(aa) selecting said image portion engraved into an immediately superior layer of the workpiece;

(bb) selecting a reduced dimension factor for said selected image portion in step (aa);

(cc) reducing said selected image portion in step (aa) by said reduced dimension factor;

(dd) utilizing said reduced selected image portions in step (cc) as designated portions of the image in step (g), a performance of said subsequent steps (h) and (i) engraving said reduced selected image in an inferior layer of the workpiece offset from said image portion of step (aa) engraved in superior layer of the workpiece, whereby said image portions in said superior and inferior layers presenting a surface therebetween.

4. The method as claimed in claim 3 wherein said surface presented in step (dd) is sloped between said image portions at a preselected angle.

5. The method as claimed in claim 1 wherein each said designated layer of said workpiece comprises a constant thickness whereby said laser beam is at a constant power during said interaction of said laser beam with said designated layer of said workpiece.

6. The method as claimed in claim 5 wherein each said thickness of said layers is equal whereby said laser beam is at a constant power during said interaction with said layers of said workpiece.

7. The method as claimed in claim 1 wherein said first layer is the topmost layer of said workpiece.

8. In a laser system having a laser beam assembly having means for translating lines on artwork into laser paths for a laser beam along a workpiece, a method of engraving a three-dimensional image into a workpiece comprising the steps of:

(a) providing a plurality of component pieces of artwork depicting a composite three-dimensional image to be engraved into the workpiece;

(b) designating a layer of the workpiece to be penetrated by the laser beam;

(c) designating one of said component pieces of artwork to be engraved into said designated layer of the workpiece, said designated component piece of artwork having lines thereon in correspondence with desired laser paths for said designated layer of the workpiece;

(d) communicating said designated component piece of said artwork in step (c) associated with said designated layer of step (b) to the laser beam assembly for translating the lines on said designated component piece of artwork of step (c) into laser paths;

(e) communicating said step (d) laser paths to the beam assembly for directing the laser beam along said workpiece in correspondence to said laser paths, the interaction of said laser beam with said workpiece removing material from said workpiece in said designated layer along said laser paths;

(f) repeating steps (b)–(e) for each subsequent layer of material in the workpiece until the total image is engraved in the workpiece.

9. The method as claimed in claim 8 wherein at least a portion of said image on said artwork is of relatively reduced dimensions on at least two successive compact pieces of artwork corresponding to successively designating material layers, wherein said image is engraved into at least two successive designated layers of the workpiece at said relatively reduced dimensions, said image engravings presenting a sloped surface between said successively designated layers.

10. The method as claimed in claim 8 wherein each said designated layer of the workpiece comprises an equal constant thickness, whereby said laser beam is at a constant power during said interaction of said laser beam with said designated layers.

11. In a laser system having a laser beam assembly having means for translating lines on artwork into laser paths along a workpiece for directing a laser beam along the workpiece, a method of engraving a three-dimensional image into a workpiece comprising the steps of:

(a) providing a composite piece of artwork depicting a three-dimensional image to be engraved into the workpiece, said artwork having lines thereon indicative of desired laser paths;

(b) designating a layer of said workpiece to be penetrated by the laser beam, said layer at a fixed thickness less than a thickness of the workpiece;

(c) selecting a portion of said composite artwork for correspondence with said designated step (b) layer of the workpiece;

(d) communicating said selected step (c) portion of said artwork corresponding to said designated layer to the laser beam assembly for translating the lines on said designated artwork portion into laser paths;

(e) communicating said laser paths to the laser beam assembly for directing the laser beam along said step (b) designated workpiece layer in correspondence to said step (d) laser paths, the interaction of said laser beam with said workpiece removing material from said designated workpiece layer along said laser paths;

(f) selecting an inferior layer of said workpiece to be penetrated by the laser beam, said inferior layer being said step (b) designated layer;

(g) repeating steps (c)–(f) for each subsequent inferior layer of material in the workpiece until the total image is engraved in the workpiece.

12. The method as claimed in claim 11 wherein said first layer is the topmost layer of said workpiece.

13. The method as claimed in claim 11 wherein each said designated layer of the workpiece comprises an equal thickness, whereby said laser beam is at a constant power during said interaction of said laser beam with said designated layers.

14. In a laser system having a laser beam, a laser control assembly, program software adapted for converting images on a piece of artwork to control signals for delivery to the control assembly, the control assembly directing the laser beam over a separate workpiece in correspondence to images on the artwork, a method of engraving a three-dimensional image into the workpiece comprising:

(a) preparing a three-dimensional piece of artwork corresponding to the desired image to be engraved into the workpiece;

(b) selecting the deepest point of the image to be engraved into the workpiece;

(c) determining the distance between the surface of the workpiece and said deepest point to be engraved into the workpiece;

(d) selecting a constant dimension for a thickness of a layer of the workpiece to be penetrated by the laser beam;

(e) dividing said layer thickness into said distance to determine the number of material layers between the workpiece surface and said deepest point of the engraving in the workpiece;

(f) selecting the layer of material to be removed from the workpiece;

(g) providing a component piece of said artwork comprising selected portions of said image, said component piece of artwork designating the material to be removed from the selected layer (f) in the workpiece;

(h) communicating said component piece of artwork in step (g) to the laser system program software, said software directing the laser beam along the workpiece in correspondence to the image on said step (g) artwork for removing from the selected layer of the workpiece material in correspondence thereto;

(i) repeating steps (f)–(h) for a subsequent inferior layer of the workpiece until the image is engraved in the workpiece.

15. The method as claimed in claim 14 wherein portions of said image on said step (g) artwork pieces are reduced in dimension wherein said image engraved in an inferior layer of a workpiece is of a lesser dimension than said image engraved in a superior layer of the workpiece whereby to expose a sloped surface extending between said superior and inferior layers in the workpiece upon said removal of workpiece material therefrom.

16. The method as claimed in claim 15 wherein said sloped surface is less than 90°.

17. In a laser system having a laser beam, a laser control assembly, program software adapted for converting images on a piece of artwork to control signals for delivery to the control assembly, the control assembly directing the laser beam over a separate workpiece in correspondence to images on the artwork, a method of engraving a three dimensional image into the workpiece comprising:

(a) providing a piece of artwork corresponding to the desired image to be engraved into the workpiece;

(b) dividing the workpiece into a plurality of material layers of constant thickness;

(c) forming said selected piece of artwork into a composite piece of artwork having a plurality of component pieces, each component piece having portions of said desired image thereon;

(d) corresponding each component piece of artwork with a material layer;

(e) selecting a layer of material to be removed from the workpiece;

(f) presenting said corresponding component piece of artwork corresponding to a selected material layer to undergo interaction with the laser beam;

(g) communicating said component piece of artwork in step (f) to the laser system program software, said software converting the images thereon to control signals for the control assembly, the assembly directing the laser beam along the workpiece in correspondence to the image portions on said step (f) component piece of artwork;

(h) repeating steps (e)–(g) for each layer of the workpiece having a corresponding piece of artwork.

* * * * *